(12) United States Patent
Lin et al.

(10) Patent No.: US 10,598,999 B2
(45) Date of Patent: Mar. 24, 2020

(54) LIQUID-CRYSTAL ACHROMATIC PHASE MODULATOR

(71) Applicants: ESSILOR INTERNATIONAL, Charenton le Pont (FR); NIKON CORPORATION, Minato-ku, Tokyo (JP)

(72) Inventors: Yi-Hsin Lin, Zhubei (TW); Hung-Shan Chen, Taichung (TW); Ming-Syuan Chen, New Taipei (TW)

(73) Assignees: ESSILOR INTERNATIONAL, Charenton-le-Pont (FR); NIKON CORPORATION, Tokyo (JP)

( * ) Notice: Subject to any disclaimer, the term of this patent is extended or adjusted under 35 U.S.C. 154(b) by 4 days.

(21) Appl. No.: 15/542,073

(22) PCT Filed: Jan. 9, 2015

(86) PCT No.: PCT/JP2015/051154
§ 371 (c)(1),
(2) Date: Jul. 6, 2017

(87) PCT Pub. No.: WO2016/111019
PCT Pub. Date: Jul. 14, 2016

(65) Prior Publication Data
US 2018/0088381 A1    Mar. 29, 2018

(51) Int. Cl.
*G02F 1/139* (2006.01)
*G02F 1/1347* (2006.01)

(52) U.S. Cl.
CPC .......... *G02F 1/1393* (2013.01); *G02F 1/1392* (2013.01); *G02F 1/13471* (2013.01);
(Continued)

(58) Field of Classification Search
CPC .. G02F 1/1393; G02F 1/13471; G02F 1/1392; G02F 2203/04; G02F 2203/06; G02F 2203/50; G02F 2203/05
(Continued)

(56) References Cited

U.S. PATENT DOCUMENTS

2007/0242186 A1* 10/2007 Ikeno ................ G02F 1/133514
349/74

FOREIGN PATENT DOCUMENTS

JP        2009-014778 A    1/2009
WO       WO 96/10210 A1    4/1996

OTHER PUBLICATIONS

Yi-Hsin Lin, et al.; "Polarization-independent liquid crystal phase modulator using a thin polymer-separated double-layered structure", Optics Express, The Optical Society, Oct. 31, 2005, vol. 13, No. 22, p. 8746-8752.

(Continued)

*Primary Examiner* — Charles S Chang
(74) *Attorney, Agent, or Firm* — SGPatents PLLC

(57) ABSTRACT

An achromatic phase modulator (100) adapted to modulate the phase of an incident beam of light (INCIDENT LIGHT) and to output the thus modulated light, the phase modulator (100) comprising a plurality of liquid crystal elements disposed in series on a light path of the incident light and a control unit (15) comprising a plurality of power sources (14) for applying drive electric signals to the liquid crystal elements, wherein the plurality of liquid crystal elements comprises at least a first and a second liquid crystal element groups (FIRST LIQUID CRYSTAL ELEMENT GROUP; SECOND LIQUID CRYSTAL ELEMENT GROUP), each group being composed of a pair of liquid crystal elements, the liquid crystal elements of the first and second group respectively being made of a first and a second liquid crystal
(Continued)

material having a first and a second, different, refractive index wavelength dependence characteristic, the thicknesses (d1/2, d2/2) of the liquid crystal elements forming each group being equal.

19 Claims, 17 Drawing Sheets

(52) U.S. Cl.
CPC ...... *G02F 2203/04* (2013.01); *G02F 2203/05* (2013.01); *G02F 2203/06* (2013.01); *G02F 2203/50* (2013.01)

(58) Field of Classification Search
USPC .......................................................... 349/73
See application file for complete search history.

(56) References Cited

OTHER PUBLICATIONS

International Search Report from International Patent Application No. PCT/JP2015/051154, dated Aug. 25, 2015.
Office Action dated May 22, 2018, in Japanese Patent Application No. 2017-536594.

* cited by examiner

FIG.1
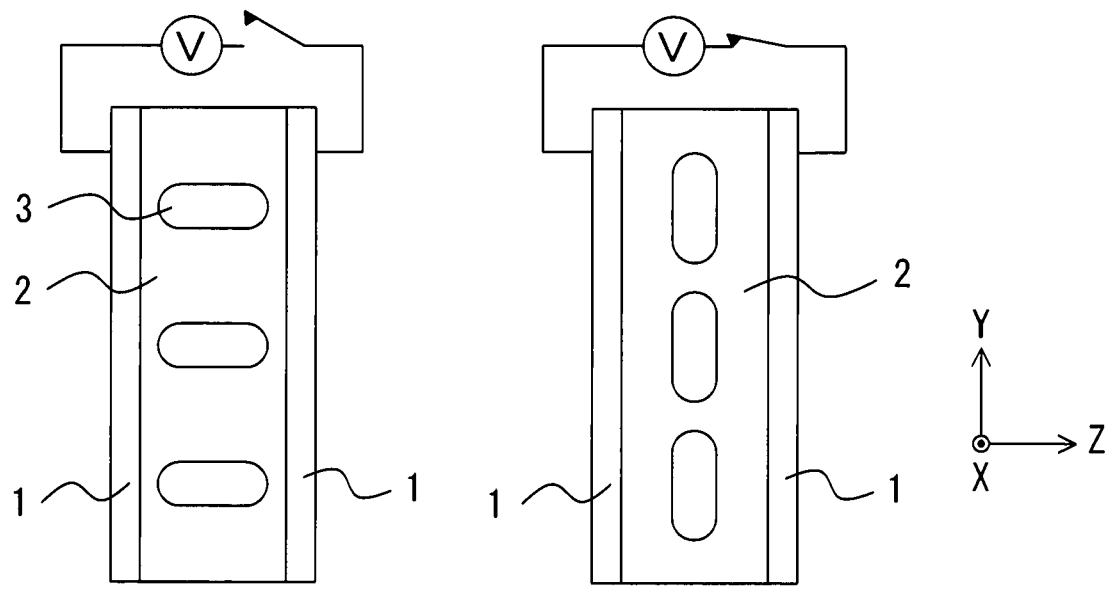
NEGATIVE TYPE (N-TYPE)
(a)
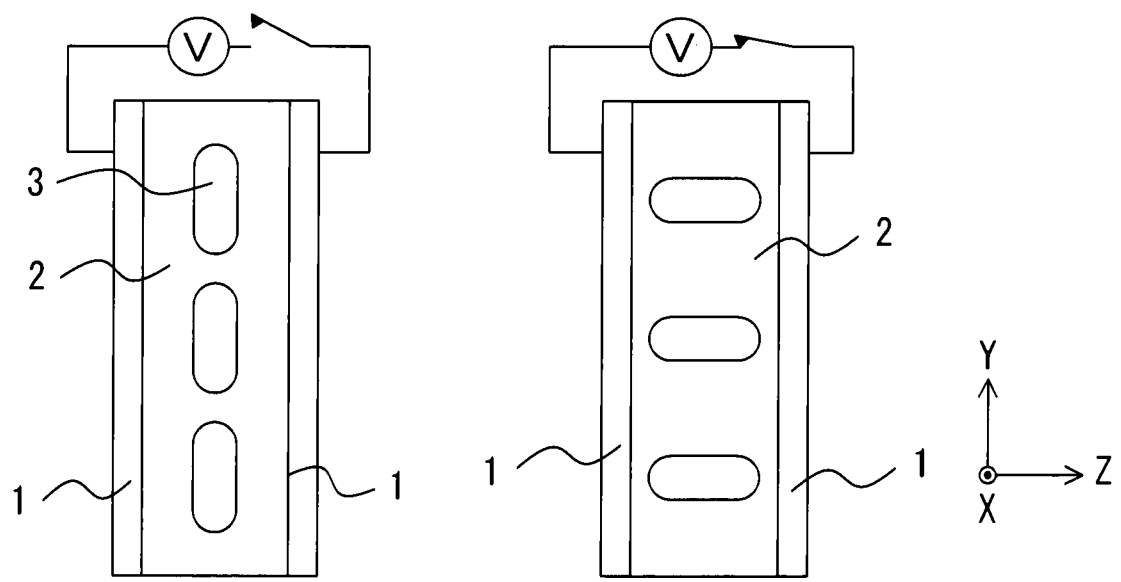
POSITIVE TYPE (P-TYPE)
(b)

FIG.4
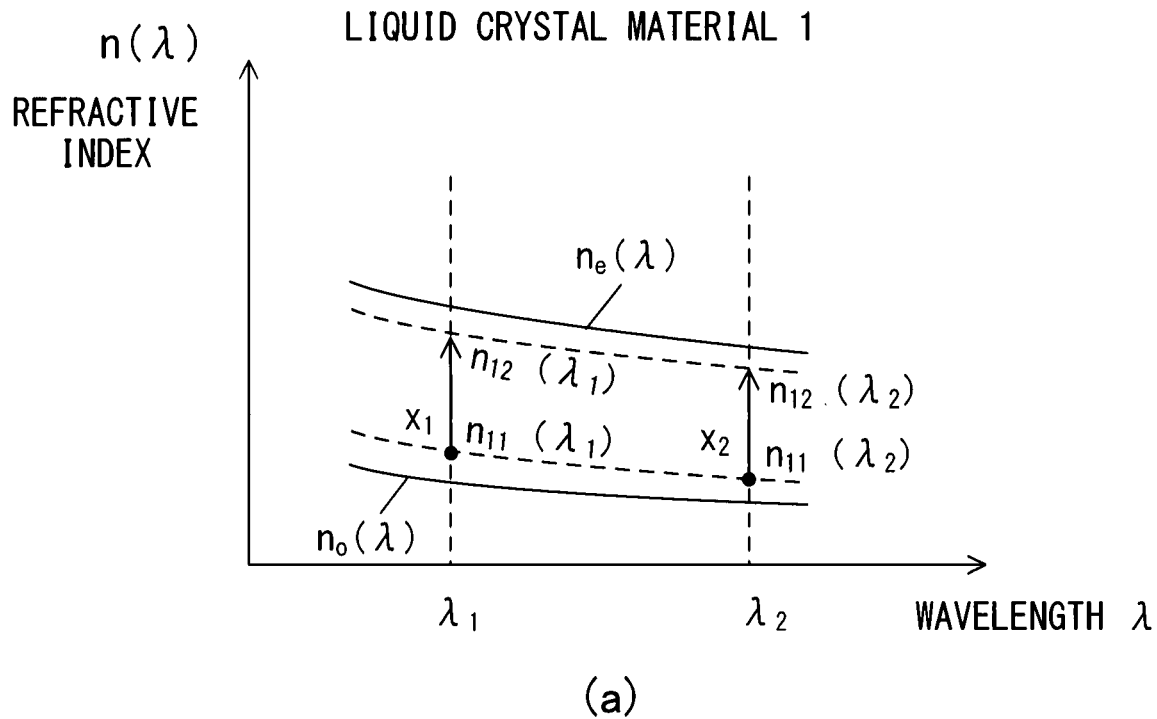
(a)
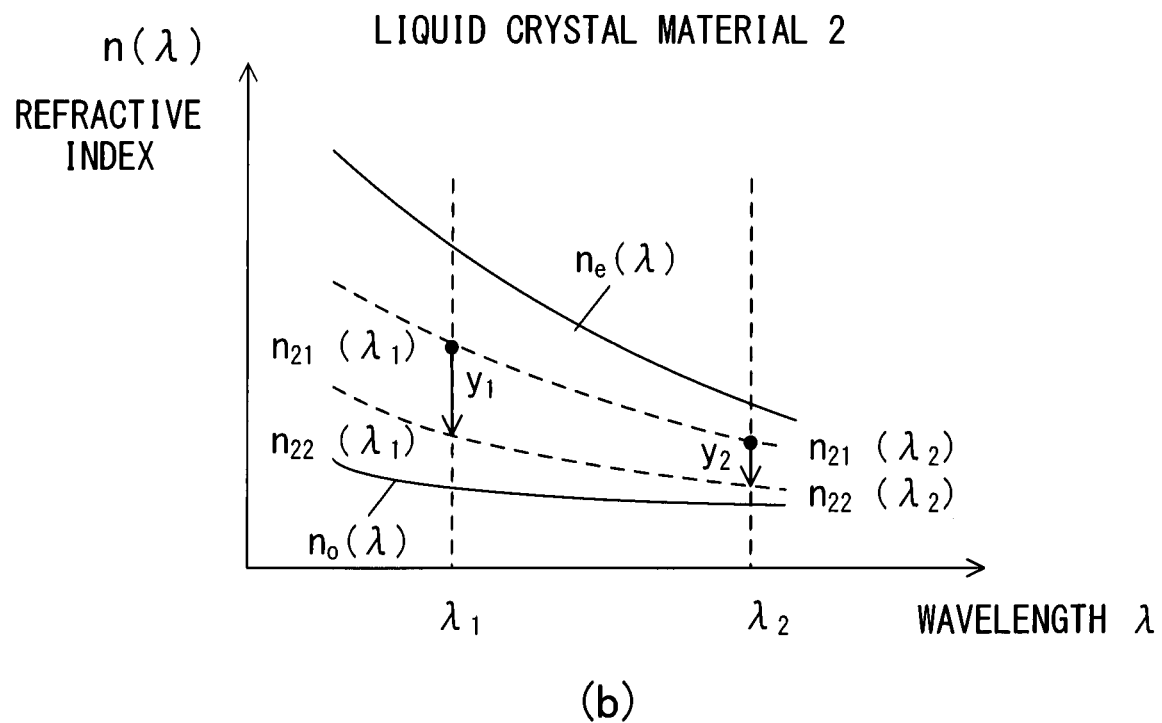
(b)

FIG.6
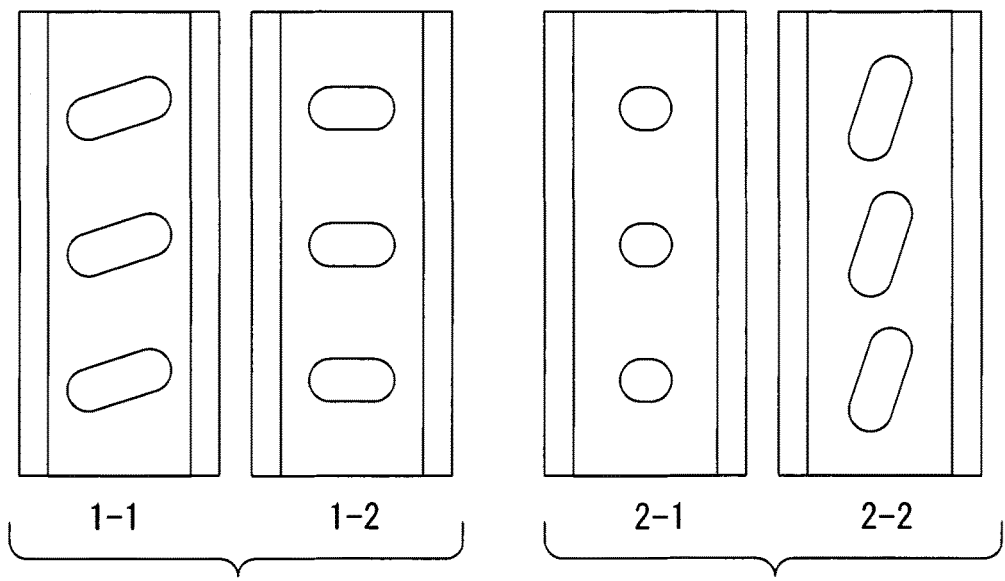
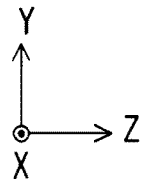
(a)
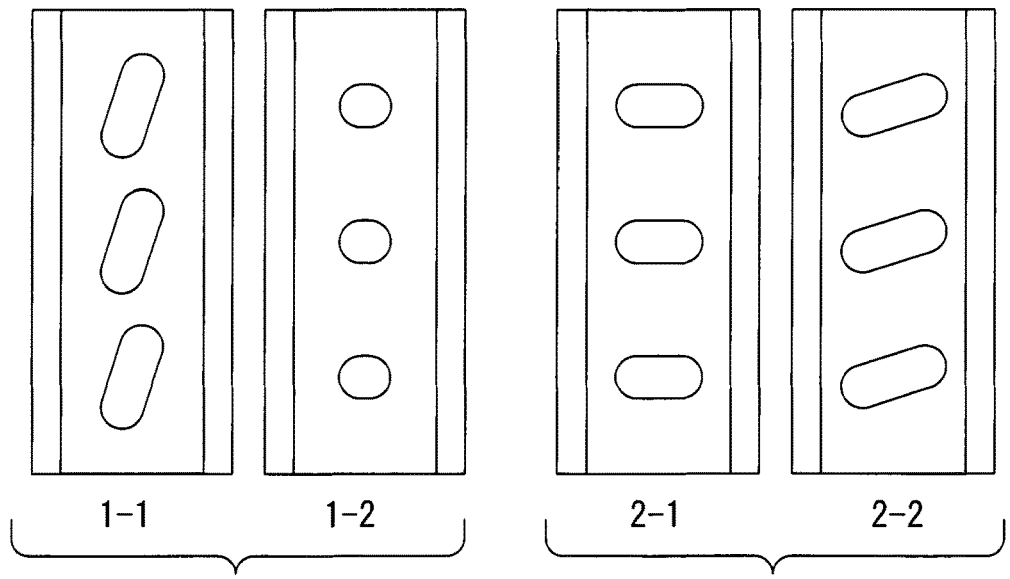
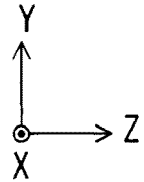
(b)

FIG.15
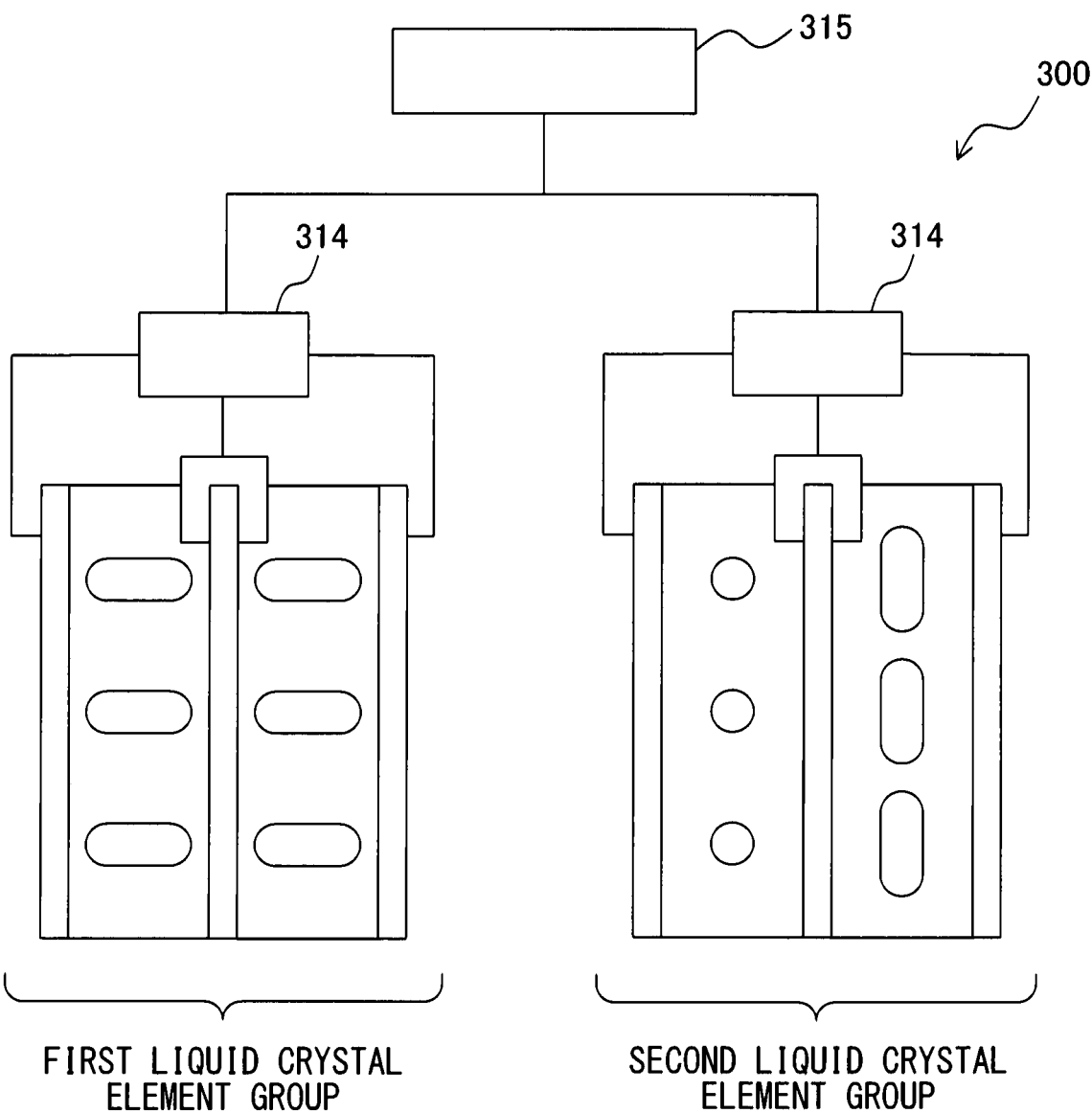
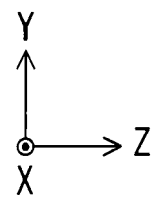

FIG.16
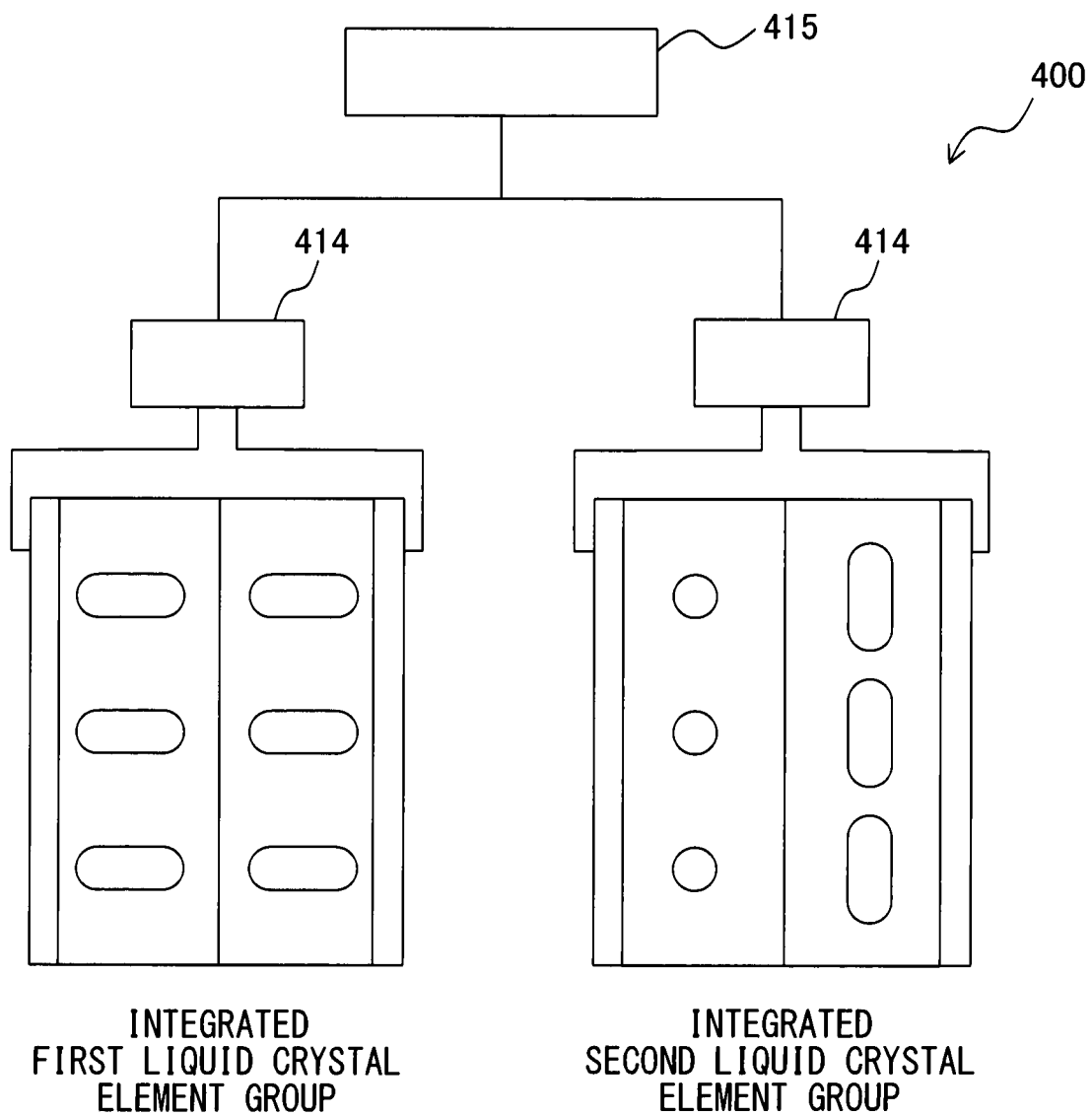
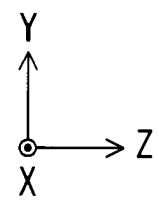

LIQUID-CRYSTAL ACHROMATIC PHASE MODULATOR

TECHNICAL FIELD

The present invention relates to an achromatic phase modulator that modulates the phase of incident light by using liquid crystal elements and outputs the light having undergone the phase modulation.

BACKGROUND ART

A great deal of attention has been focused on technological development pertaining to phase modulation achieved via liquid crystal elements in recent years. Such efforts have led to, for instance, an invention according to which a transmissive spatial light modulating element is used as an image information source for a digital hologram recording device (see patent literature 1). The publication cited above discloses that the use of a nematic liquid crystal element for purposes for modulating phase and intensity makes it possible to output light without rotating the plane of polarization of a polarized light as an incident light. Also, a liquid crystal phase modulator which is able to modulate a phase independently of polarization state (see non-patent literature 1).

CITATION

Patent Literature

Patent Literature 1: Japanese laid open patent publication No. 2009-14778
Non-Patent Literature 1: Yi-Hsin Lin, Yung-Hsun Wu, Yue Zhao, Jiyu Fang, Zhibing Ge, and Shin-Tson Wu; "Polarization-independent liquid crystal phase modulator using polymer-separated double layered structure"; Optics Express; (USA); The Optical Society; Oct. 31, 2005; Vol. 13, No. 22; p. 8746-8752

SUMMARY OF THE INVENTION

Technical Problem

The phase modulator disclosed in patent literature 1 modulates a phase of an incident light after converting from non-polarized light to linearly polarized light. Phase modulation quantity by the phase modulator disclosed in patent literature 1 change with wavelength of the incident light. Although the phase modulator disclosed in non-patent literature 1 can modulate a phase of an incident light independently to a polarization state, phase modulation quantity change with wavelength of the incident light. Therefore, only a single wavelength light can be used for these phase modulators, and it means that it is not possible for these phase modulator to achieve phase modulation of a color image formed with light originating from, for instance, a white light source. For this reason, achromatic phase modulators capable of achieving a substantially uniform phase modulation quantity in correspondence to light at any wavelength within a wide wavelength range, such as the visible light wavelength range, are of great interest.

Solution to Problems

According to the first aspect of the present invention, an achromatic phase modulator that modulates phase of an incident light and outputs the light having undergone phase modulation, comprises: a plurality of liquid crystal elements disposed in series on a light path of the incident light, which are composed of liquid crystal materials; and a control unit for applying drive electric signals to the liquid crystal elements so as to achieve achromatic phase modulation for the incident light, wherein: the plurality of liquid crystal element comprises at least a first liquid crystal element group composed of a pair of liquid crystal elements both of which liquid crystal materials have a first refractive index wavelength dependence characteristics and a second liquid crystal element group composed of a pair of liquid crystal elements both of which liquid crystal materials have a second refractive index wavelength dependence characteristics; and thicknesses of both of liquid crystal material layers of the liquid crystal elements constituting the first liquid crystal element group are substantially the same in each other, and thicknesses of both of liquid crystal material layers of the liquid crystal elements constituting the second liquid crystal element group are substantially the same in each other.

According to the second aspect of the present invention, in the achromatic phase modulator according to the first aspect, it is preferred that in the pair of liquid crystal elements constituting the first liquid crystal element group, an alignment direction of liquid crystal molecules of one of the liquid crystal element can be altered in a plane including a first alignment direction substantially parallel to a direction in which the incident light advances, and a second alignment direction perpendicular to the first alignment direction, and an alignment direction of liquid crystal molecules of another of the liquid crystal element can be altered in a plane including the first alignment direction and a third alignment direction perpendicular to both of the first alignment direction and the second alignment direction, in the pair of liquid crystal elements constituting the second liquid crystal element group, an alignment direction of liquid crystal molecules of one of the liquid crystal element can be altered in a plane including the first alignment direction and a fourth alignment direction perpendicular to the first alignment direction, and an alignment direction of liquid crystal molecules of another of the liquid crystal element can be altered in a plane including the first alignment direction and a fifth alignment direction perpendicular to both of the first alignment direction and the fourth alignment direction.

According to the third aspect of the present invention, in the achromatic phase modulator according to the second aspect, it is preferred that in each of the plurality of the liquid crystal elements, by changing the alignment directions of the liquid crystal molecules can be set individually, a first modulation condition under which a first modulation quantity is achieved and a second modulation condition under which a second modulation quantity different from the first modulation quantity are achieved, in correspondence to the applying drive electric signals to each of the liquid crystal elements; and for light having a given wavelength, in one of the first and second liquid crystal element groups, an average of refractive indices of the pair of liquid crystal elements in the first alignment condition is greater than an average of refractive indices of the pair of liquid crystal elements in the second alignment condition, and in the other of the first and second liquid crystal element groups, an average of refractive indices of the pair of liquid crystal elements in the first alignment condition is smaller than an average of refractive indices of the pair of liquid crystal elements in the second alignment condition.

According to the fourth aspect of the present invention, in the achromatic phase modulator according to the second or third aspect, it is preferred that while the drive electric signal is not being applied to each of the liquid crystal elements, both of the alignment directions of the pair of liquid crystal molecules constituting the first liquid crystal element group are in the first alignment direction, whereas one of the alignment directions of the pair of liquid crystal molecules constituting the second liquid crystal element group is in the fourth alignment direction and the other of the alignment directions of the pair of liquid crystal molecules constituting the second liquid crystal element group is in the fifth alignment direction.

According to the fifth aspect of the present invention, in the achromatic phase modulator according to any one of the second through fourth aspects, it is preferred that the second alignment direction is identical to the fourth alignment direction and the third alignment direction is identical to the fifth alignment direction.

According to the sixth aspect of the present invention, the achromatic phase modulator according to the second aspect, it is preferred that the achromatic phase modulator further comprises the third liquid crystal element group composed of a pair of liquid crystal elements, disposed in series on the light path of the incident light, both of which liquid crystal materials have a third refractive index wavelength dependence characteristics, wherein: in the pair of liquid crystal elements constituting the third liquid crystal element group, an alignment direction of liquid crystal molecules of one of the liquid crystal element can be altered in a plane including the first alignment direction and a sixth alignment direction perpendicular to the first alignment direction, and an alignment direction of liquid crystal molecules of another of the liquid crystal element can be altered in a plane including the first alignment direction and a seventh alignment direction perpendicular to both of the first alignment direction and the sixth alignment direction; and thicknesses of both of liquid crystal material layers of the liquid crystal elements constituting the third liquid crystal element group are substantially the same in each other.

According to the seventh aspect of the present invention, in the achromatic phase modulator according to the sixth aspect, it is preferred that in each of the plurality of the liquid crystal elements, the alignment directions of the liquid crystal molecules can be set individually to a first alignment condition under which a first modulation quantity is achieved and to a second modulation condition under which a second modulation quantity different from the first modulation quantity is achieved, in correspondence to the applying drive electric signals to each of the liquid crystal elements; and for light having a given wavelength, in two of the first, second and third liquid crystal element groups, an average of refractive indices of the pair of liquid crystal elements in the first alignment condition is greater than an average of refractive indices of the pair of liquid crystal elements in the second alignment condition, and in remaining one of the first, second and third liquid crystal element groups, an average of refractive indices of the pair of liquid crystal elements in the first alignment condition is smaller than an average of refractive indices of the pair of liquid crystal elements in the second alignment condition, or in one of the first, second and third liquid crystal element groups, an average of refractive indices of the pair of liquid crystal elements in the first alignment condition is greater than an average of refractive indices of the pair of liquid crystal elements in the second alignment condition, and in remaining two of the first, second and third liquid crystal element groups, an average of refractive indices of the pair of liquid crystal elements in the first alignment condition is smaller than an average of refractive indices of the pair of liquid crystal elements in the second alignment condition.

According to the eighth aspect of the present invention, in the achromatic phase modulator according to the eleventh or sixth or seventh aspect, it is preferred that while the drive electric signal is not being applied to the each of the liquid crystal elements, all of the alignment directions of the pair of liquid crystal molecules constituting the first, second and third liquid crystal element groups are in the first alignment direction.

According to the ninth aspect of the present invention, in the achromatic phase modulator according to any one of the sixth through eighth aspects, it is preferred that at least two of the alignment directions among the second alignment direction, the fourth alignment direction and the sixth alignment direction are the same in each other, and at least two of the alignment directions among the third alignment direction, the fifth alignment direction and the seventh alignment direction are the same in each other.

According to the tenth aspect of the present invention, in the achromatic phase modulator according to any one of the first through ninth aspects, it is preferred that the control unit applies substantially the same control electric signals to each of the pair of liquid crystal elements constituting in each of the liquid crystal elements.

According to the eleventh aspect of the present invention, in the achromatic phase modulator according to any one of the first through tenth aspects, it is preferred that the incident light has a wavelength within a visible range, and the liquid crystal elements are all nematic liquid crystal elements.

According to the twelfth aspect of the present invention, in the achromatic phase modulator according to any one of the first through eleventh aspects, it is preferred that in at least one of the first liquid crystal element group and the second liquid crystal element group, the pair of liquid crystal elements constituting thereof are positioned in series along the incident light advancing direction to each other.

According to the thirteenth aspect of the present invention, in the achromatic phase modulator according to any one of the first through twelfth aspects, it is preferred that in at least one of the first liquid crystal element group and the second liquid crystal element group, the pair of liquid crystal elements constituting thereof are positioned in contact with each other.

According to the fourteenth aspect of the present invention, in the achromatic phase modulator according to any one of the first through thirteenth aspects, it is preferred that in at least one of the first liquid crystal element group and the second liquid crystal element group, the pair of liquid crystal elements constituting thereof build an integrated liquid crystal element having a pair of substrates and a layer, centrally located between the pair of substrates, separates thereby to each of the pair of liquid crystal elements.

According to the fifteenth aspect of the present invention, in the achromatic phase modulator according to any one of the first through fourteenth aspects, it is preferred that the integrated liquid crystal element is to be applied with single system drive electric signal.

According to the sixteenth aspect of the present invention, in the achromatic phase modulator according to any one of the first through fifteenth aspects, it is preferred that thicknesses of liquid crystal material layers at the liquid crystal elements are set so as to achieve any extents of phase modulation falling within the range between zero and the maximum phase modulation by controlling the drive electric signals to be applied to each of the liquid crystal elements.

According to the seventeenth aspect of the present invention, in the achromatic phase modulator according to any one of the first through sixteenth aspects, it is preferred that the drive electric signal is provided as a voltage.

According to the eighteenth aspect of the present invention, in the achromatic phase modulator according to any one of the first through seventeenth aspects, it is preferred that the thicknesses of the liquid crystal material layers at the liquid crystal elements constituting each of the liquid crystal element groups are all set equal to or less than 30 µm.

According to the nineteenth aspect of the present invention, in the achromatic phase modulator according to any one of the first through eighteenth aspects, it is preferred that the liquid crystal elements are each divided into a plurality of separate divisional liquid crystal areas arranged in a two-dimensional array; the divisional liquid crystal areas arrayed at one liquid crystal element corresponds to the divisional liquid crystal areas at another liquid crystal element; and the control means executes control so as to apply a drive electric signal individually to each of the divisional liquid crystal areas.

According to the twentieth aspect of the present invention, an optical device comprises the achromatic phase modulator according to any one of the first through nineteenth aspects.

According to the twenty first aspect of the present invention, the optical device according to the twentieth aspect, it is preferred that a haze is equal to 2% or less.

The present invention also concerns an optical device comprising such achromatic phase modulator. The optical device, might be one of an ophthalmic lens, an ocular visor, and sight optical systems, the ophthalmic lens is a lens which is designed to fit a spectacles frame so as to protect the eye and/or correct the sight and can be a non-corrective (also called plano or afocal lens) or corrective ophthalmic lens. Corrective lens may be a unifocal, a bifocal, a trifocal or a progressive lens. An ocular visor is understood as such found in masks, goggles, helmets or other headgears, and being designed to be positioned in front of the eyes, here, goggles and masks refer to for example ski goggles or scuba or snorkelling masks, protection goggles, and other similar devices.

The optical device according to the present invention can be an ophthalmic lens which has a curvature. The optical device according to the present invention has a haze equal 2% or less and preferably no greater than 0.4%. The haze value is measured by light transmission measurement using the Haze-Guard Plus© haze meter manufactured by BYK-Gardner (or a color difference meter) according to the method of ASTM D1003-00, which is incorporated herein in its entirety by reference. All references to "haze" values in this application are by this standard. The instrument is first calibrated according to the manufacturer's instructions. Next, the sample is placed on the transmission light beam of the pre-calibrated meter and the haze value is recorded from three different specimen locations and averaged.

Advantageous Effect of the Invention

The present invention provides an achromatic phase modulator that is capable of executing achromatic phase modulation in conjunction with light including non-polarized light over a wide wavelength range.

BRIEF DESCRIPTION OF THE DRAWINGS

FIG. 1 schematically illustrates how the direction of the alignment of liquid crystal molecules.

FIG. 4 presents graphs indicating the refractive index wavelength dependence characteristics of two types of liquid crystal materials.

FIG. 6 schematically illustrates how the direction of the alignment of liquid crystal molecules in each of liquid crystal elements for phase modulation by an achromatic phase modulator which is configured with two sets of liquid crystal element groups.

FIG. 15 is a schematic diagram showing the structure of an achromatic phase modulator according to one embodiment of the present invention, which is configured with two integrated liquid crystal elements.

FIG. 16 is a schematic diagram showing the structure of an achromatic phase modulator according to one embodiment of the present invention, which is configured with two integrated liquid crystal elements each having a layer which separates liquid crystal molecules thereby.

DESCRIPTION OF EMBODIMENTS

Figure 2:
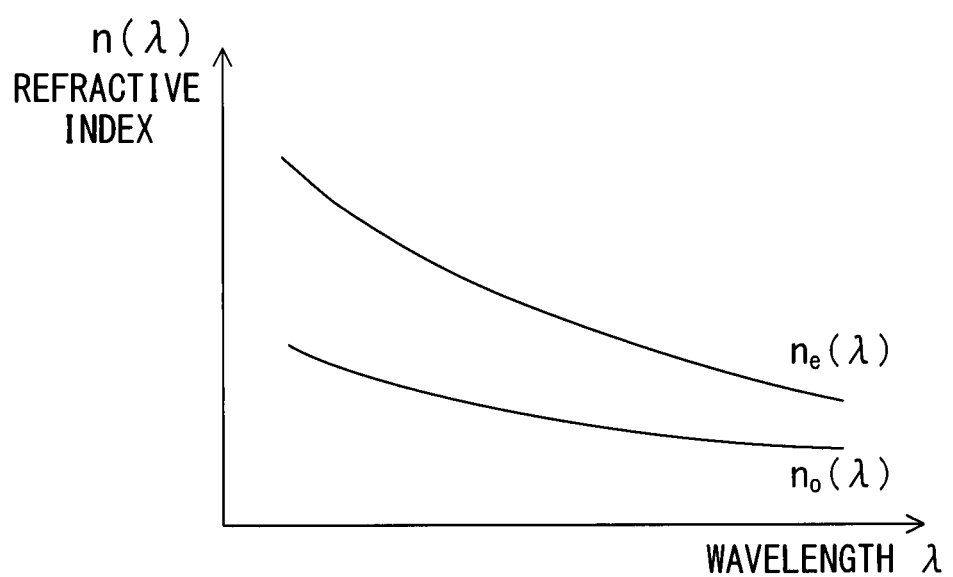
FIG. 2 presents graphs indicating the refractive index wavelength dependence.

In the following description, an embodiment of one embodiment of the present invention is explained with reference to the figures. The phase modulator according to the embodiment of the present invention is configured by disposing a plurality of liquid crystal elements in an incident light advancing direction. In each of the liquid crystal elements, an alignment direction of liquid crystal molecules can be altered in a plane including a direction perpendicular to a substrate and one direction parallel to the substrate in correspondence to a state of applying drive electric signals. Such liquid crystal element is called zero-twist liquid crystal element.

There are commonly two types of zero-twist nematic liquid crystal elements. Their behavior is explained by referring FIG. 1(a) for vertical aligned element and 1(b) for anti-parallel aligned element. In FIGS. 1(a) and 1(b), X axis is to be set in a direction perpendicular to the drawing sheet, Y axis is to be set in a direction parallel to the drawing sheet, and Z axis is to be set in a direction along the incident light advancing. FIGS. 1(a) and 1(b) illustrate sectional views of the alignment of liquid crystal elements. It is to be noted that azimuthal alignment directions are parallel to the drawing sheet. In FIGS. 1(a) and 1(b), reference numeral 1 and 2 respectively indicate a substrate and a liquid crystal material, and the ovals denoted with the reference numeral 3 depict liquid crystal molecules. The liquid crystal molecules inside the liquid crystal elements may be tilted along any direction between a direction perpendicular to the substrate surfaces and one direction parallel to the substrate.

FIG. 1(a) illustrates the vertical aligned liquid crystal element having a negative dielectric anisotropy (N-type liquid crystal element) and FIG. 1(b) illustrates the anti-parallel aligned liquid crystal element having a positive dielectric anisotropy (P-type liquid crystal element).

In N-type liquid crystal element illustrated in FIG. 1(a), liquid crystal molecules are aligned along a direction perpendicular to the substrate during no drive electric signal (voltage, for example) is being applied. Whereas, liquid crystal molecules are aligned along one direction parallel to the substrate during sufficient drive electric signal (sufficient high voltage, for example) is being applied.

In P-type liquid crystal element illustrated in FIG. 1(b), liquid crystal molecules are aligned along one direction parallel to the substrate during no drive electric signal is being applied. Whereas, liquid crystal molecules are aligned along a direction perpendicular to the substrate during sufficient drive electric signal is being applied.

The refractive index of the liquid crystal material with regard to incoming linearly polarized light changes in correspondence to the tilt angle of the liquid crystal molecule. In particular, with regard to incoming linearly polarized light, refractive index of the liquid crystal element in which the liquid crystal molecules are aligned along a direction perpendicular to the substrate is different from that in which the liquid crystal molecules are aligned along one direction parallel to the substrate. In general, for the light having a wavelength of $\lambda$, the ordinary refractive index $n_o(\lambda)$ of the liquid crystal material is smaller than the extraordinary refractive index $n_e(\lambda)$ thereof. The effective refractive index corresponds to the refractive index experienced by the linearly polarized light as it passed through liquid crystal material, and its value is between $n_o(\lambda)$ and $n_e(\lambda)$. In the present description, the refractive index of the liquid crystal element in which the liquid crystal molecules are aligned along a direction perpendicular to the substrate is to be represented as $n_o(\lambda)$ and that in which the liquid crystal molecules are aligned along one direction parallel to the substrate is to be represented as $n_e(\lambda)$. Both of $n_o(\lambda)$ and $n_e(\lambda)$ change in correspondence to the wavelength $\lambda$ of the incoming light. Such phenomenon will be referred to as "refractive index wavelength dependence characteristics" in this description. The refractive index wavelength dependence characteristics depend on liquid crystal material. FIG. 2 typically illustrates the refractive index wavelength dependence characteristics. FIG. 2 clearly shows, both of $n_o(\lambda)$ and $n_e(\lambda)$ decrease as the wavelength $\lambda$ increases, and also $n_e(\lambda)-n_o(\lambda)$ decreases as the wavelength $\lambda$ increases.

The phase modulator according to one embodiment of the present invention will be explained next. The phase modulator according to the embodiment of the present invention includes at least a first liquid crystal element group composed of a pair of liquid crystal elements with liquid crystal material having a first refractive index wavelength dependence characteristics and a second liquid crystal element group composed of a pair of liquid crystal elements with liquid crystal material having a second refractive index wavelength dependence characteristics. Namely, the phase modulator according to the embodiment of the present invention includes at least four liquid crystal elements. Thicknesses of liquid crystal material layers of each of the pair of liquid crystal elements in the first liquid crystal element group are the same, and also thicknesses of liquid crystal material layers of each of the pair of liquid crystal elements in the second liquid crystal element group are the same.

In the first liquid crystal element group, the pair of liquid crystal elements are arranged so that respective planes in which alignment direction of liquid crystal molecules changes are perpendicular to each other. Namely, in the first liquid crystal element group, the alignment direction of liquid crystal molecules in one of the liquid crystal element can be altered in a plane including a first alignment direction perpendicular to the substrate and a second alignment direction parallel to the substrate, and an alignment direction of liquid crystal molecules in another of the liquid crystal element can be altered in a plane including the first alignment direction and a third alignment direction which is parallel to the substrate and in the same time perpendicular to the second alignment direction.

Figure 3:
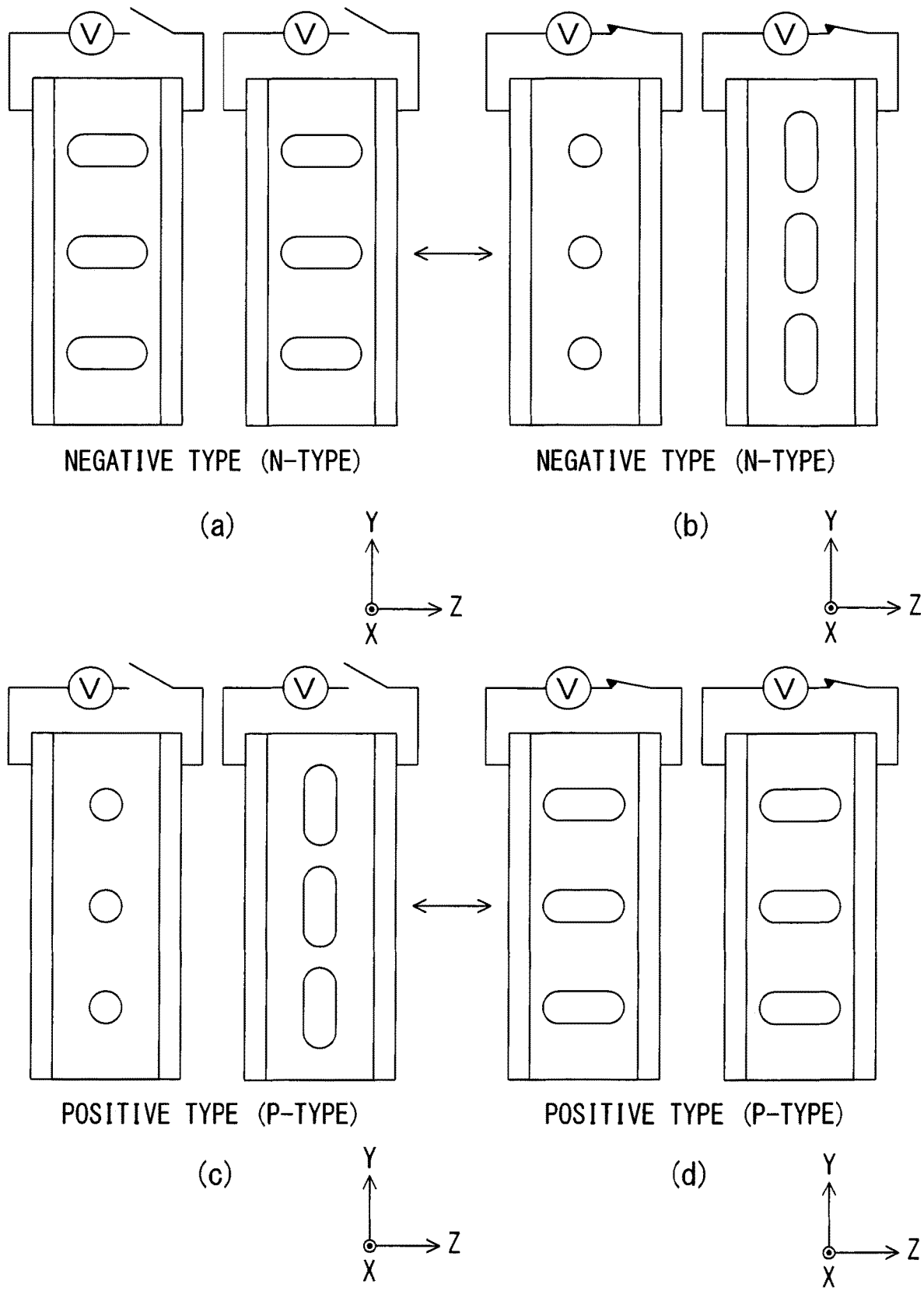
FIG. 3 schematically illustrates how the direction of the alignment of liquid crystal molecules in each of a pair of liquid crystal elements constituting liquid crystal element group.

FIG. 3 schematically illustrates how the direction of the alignment of liquid crystal molecules in each of a pair of liquid crystal elements constituting liquid crystal element group changes through phase modulation. FIGS. 3(a) and 3(b) show the phase modulator in a case it is configured with N-type liquid crystal elements. In FIGS. 3(a) and 3(b), X axis is to be set in a direction perpendicular to the drawing sheet, Y axis is to be set in a direction parallel to the drawing sheet, and Z axis is to be set in a direction along the incident light advancing. In FIG. 3(a), no drive electric signals are being applied to the liquid crystal elements. In such case, both of alignment directions of the pair of the liquid crystal elements are aligned along the first alignment direction. On the other hand, in FIG. 3(b), sufficient drive electric signals are being applied to the liquid crystal elements. In such case, both of alignment directions of the pair of the liquid crystal elements are respectively aligned along the second alignment direction and the third alignment direction. The first alignment direction, the second alignment direction and the third alignment direction are perpendicular with respect to one another. It is to be noted that circles in left side of the liquid crystal element in FIG. 3(b) depicts that the alignment direction of the liquid crystal molecules of this liquid crystal element is perpendicular to the drawing sheet.

FIGS. 3(c) and 3(d) show the phase modulator in a case it is configured with P-type liquid crystal elements. In FIG. 3(d), sufficient high drive electric signals are being applied to the liquid crystal elements. In such case, both of alignment directions of the pair of the liquid crystal elements are aligned along the first alignment direction. On the other hand, in FIG. 3(c), no drive electric signals are being applied to the liquid crystal elements. In such case, both of alignment directions of the pair of the liquid crystal elements are respectively aligned along the second alignment direction and the third alignment direction.

Also in the second liquid crystal element group, the pair of liquid crystal elements are arranged so that respective planes in which alignment direction of liquid crystal molecules are perpendicular to each other. Namely, in the second liquid crystal element group, an alignment direction of liquid crystal molecules of one of the liquid crystal element can be altered in a plane including the first alignment direction and a fourth alignment direction parallel to the substrate, and an alignment direction of liquid crystal molecules of another of the liquid crystal element can be altered in a plane including the first alignment direction and a fifth alignment direction which is parallel to the substrate and in the same time perpendicular to the fourth alignment direction.

It is to be noted that in FIGS. 3(b) and 3(c), both of alignment directions of the liquid crystal molecules of left side liquid crystal element are perpendicular to the drawing sheet and both of alignment directions of the liquid crystal molecules of right side liquid crystal element are parallel to the drawing sheet. However, the second alignment direction and the third alignment direction not always have to be respectively perpendicular and parallel to the drawing sheet. They only need to be perpendicular to each other and to be perpendicular to the first alignment direction. Also, the fourth alignment direction and the fifth alignment direction not always have to be respectively perpendicular and parallel to the drawing sheet, and they only need to be perpendicular to each other and to be perpendicular to the first alignment direction.

The second alignment direction may coincide with the fourth alignment direction or with the fifth alignment direction, or not. Also, the third alignment direction may coincide with the fifth alignment direction or to the fourth alignment direction, or not. Namely, if it is satisfied that relationship between each of the pair of the liquid crystal elements in each of the first and second liquid crystal element groups, angular relationship between the first and second liquid crystal element groups is not limited, as long as each surface of the substrates is perpendicular to the first alignment direction.

Each of the pair of liquid crystal elements constituting the first liquid crystal element group may be positioned in series along the incident light advancing direction to each other, or not. Also, each of the pair of liquid crystal elements constituting the second liquid crystal element group may be positioned in series along the incident light advancing direction to each other, or not.

In a case each of the pair of liquid crystal elements constituting the first liquid crystal element group are positioned in series along the incident light advancing direction to each other, they may be positioned in contact with each other. Also, in a case each of the pair of liquid crystal elements constituting the second liquid crystal element group are positioned in series along the incident light advancing direction to each other, they may be positioned in contact with each other. In such case, adhesive may be filled between two liquid crystal elements positioned in contact with each other without air layer. Furthermore, contacted two liquid crystal elements may have one substrate between them in common.

The pair of liquid crystal elements constituting each of the liquid crystal element groups may be built as one integrated liquid crystal element having a centrally located separating layer which exists between each of the pair liquid crystal elements. The separating layer is constructed as a double layers each of which having anisotropy perpendicular to each other. In such configuration, it is possible to control alignment directions of the pair of liquid crystal elements of the integrated liquid crystal element by applying single system drive electric signal.

Next, an explanation about a behavior of the pair of liquid crystal elements when an incident light enters thereto will be provided. N-type liquid crystal elements shown in FIGS. 3(a) and 3(b) are used as the pair of liquid crystal elements.

In the state shown in FIG. 3(a), as no drive electric signals are applied to both of the pair of liquid crystal elements, alignment directions of liquid crystal molecules of both of the pair of liquid crystal elements are aligned along the first alignment direction, i.e. an incident light advancing direction. In this state, as the alignment directions of the liquid crystal molecules in both of the pair of liquid crystal elements are the same as the incident light advancing direction, even if a polarization plane of the linearly polarized light is any direction, the refractive index for the light having a wavelength $\lambda$ is $n_o(\lambda)$. Therefore, assuming that, the total thickness of the liquid crystal material layers of the pair of liquid crystal elements is d, namely, thicknesses of respective thickness of the liquid crystal material layer of the pair of liquid crystal elements are d/2, phase change $\emptyset_o$ of the light after passing through the pair of liquid crystal elements can be expressed as in expression (1) described below.

$$\emptyset_o(\lambda)=2\pi(d/2)n_o(\lambda)/\lambda+2\pi(d/2)n_o(\lambda)/\lambda=2\pi d n_o(\lambda)/\lambda \qquad (1)$$

Namely, when non-polarized light passes through the pair of liquid crystal elements, no birefringence occurs and phase change of the light follows to expression (1).

Next, an explanation about a behavior in the state shown in FIG. 3(b), namely, sufficient drive electric signals are applied to both of the pair of liquid crystal elements will be provided. In this state, each of the liquid crystal molecules of the pair of liquid crystal elements are respectively aligned along the second alignment direction and the third alignment direction. For ease of explanation, the alignment direction of the left side of the liquid crystal element in FIG. 3(b) represents the second alignment direction, and the alignment direction of the right side of the liquid crystal element in FIG. 3(b) represents the third alignment direction. In addition, X axis is to be set in the second alignment direction and Y axis is to be set in the third alignment direction.

In the left side of the liquid crystal element shown in FIG. 3(b), for the linearly polarized light, assuming that the refractive index in the direction of X axis represents $n_{X1}(\lambda)$ and the refractive index in the direction of Y axis represents $n_{Y1}(\lambda)$, the behavior of the liquid crystal element for a linearly polarized light having any direction of polarization plane passing through it is expressed by using Jones matrix as;

$$W_1 = \begin{pmatrix} e^{-in_{X1}(\lambda)\frac{2\pi}{\lambda}(d/2)} & 0 \\ 0 & e^{-in_{Y1}(\lambda)\frac{2\pi}{\lambda}(d/2)} \end{pmatrix}$$

In the right side of the liquid crystal element shown in FIG. 3(b), for the linearly polarized light having any direction of the polarization plane, assuming that the refractive index in the direction of X axis represents $n_{X2}(\lambda)$ and the refractive index in the direction of Y axis represents $n_{Y2}(\lambda)$, the behavior of the liquid crystal element for the linearly polarized light having any direction of polarization plane passing through it is expressed by using Jones matrix as;

$$W_2 = \begin{pmatrix} e^{-in_{X2}(\lambda)\frac{2\pi}{\lambda}(d/2)} & 0 \\ 0 & e^{-in_{Y2}(\lambda)\frac{2\pi}{\lambda}(d/2)} \end{pmatrix}$$

Thus, the behavior of the pair of liquid crystal elements shown in FIG. 3(b) for the linearly polarized light having any direction of polarization plane passing through them is expressed by using Jones matrix as;

$$W_{12} = \begin{pmatrix} e^{-in_{X1}(\lambda)\frac{2\pi}{\lambda}(d/2)} & 0 \\ 0 & e^{-in_{Y1}(\lambda)\frac{2\pi}{\lambda}(d/2)} \end{pmatrix} \begin{pmatrix} e^{-in_{X2}(\lambda)\frac{2\pi}{\lambda}(d/2)} & 0 \\ 0 & e^{-in_{Y2}(\lambda)\frac{2\pi}{\lambda}(d/2)} \end{pmatrix}$$

Here, as both of the liquid crystal materials of the pair of liquid crystal elements are the same to each other, $n_{X1}(\lambda)=n_{Y2}(\lambda)$ and $n_{Y1}(\lambda)=n_{X2}(\lambda)$. For a linear polarized light having a polarization plane direction along the X axis entering the pair of liquid crystal elements, the refractive indices for the incident light are respectively $n_{X1}(\lambda)=n_e(\lambda)$ passing through the first liquid crystal element and $n_{X2}(\lambda)=n_o(\lambda)$ passing through the second liquid crystal element. Also for a linear polarized light having a polarization plane direction along the Y axis impinging the pair of liquid crystal elements, the refractive indices for the incident light are respectively $n_{Y1}(\lambda)=n_o(\lambda)$ passing through the first liquid crystal element and $n_{Y2}(\lambda)=n_e(\lambda)$ passing through the second liquid crystal element. Thus, for the linearly polarized light having any direction of polarization plane, the refractive index for the light passing through the pair of liquid crystal elements is $n_o(\lambda)+n_e(\lambda)$, and expression (2) is obtained.

$$W_{12} = e^{-i\left(\frac{n_e(\lambda)+n_o(\lambda)}{2}\right)\frac{2\pi}{\lambda}d} \begin{pmatrix} 1 & 0 \\ 0 & 1 \end{pmatrix} \quad (2)$$

From expression (2), it can be deduced that the pair of liquid crystal elements of respective thickness equal d/2 is behaving like a single liquid crystal element of thickness equal to d and of refractive index equal to the average of refractive indices $(n_e(\lambda)+n_o(\lambda))/2$.

From expression (2), as oscillating components in X axis and Y axis are equal to each other, even if a polarization plane of the linearly polarized light is any direction, the refractive index for the light having a wavelength $\lambda$ is $(n_e(\lambda)+n_o(\lambda))/2$. Thus, the phase of the light after passing through the pair of liquid crystal elements is independent from the polarization state thereof. From expression (2), phase change in this state is represented as expression (3) below.

$$\emptyset_e(\lambda)=2\pi(d/2)n_e(\lambda)/\lambda+2\pi(d/2)n_o(\lambda)/\lambda=\pi(n_e(\lambda)+n_o(\lambda))d/\lambda \quad (3)$$

From expression (3), it is known that phase change $\emptyset_e(\lambda)$ corresponds to the phase change at which a light-passes through a liquid crystal element with liquid crystal material whose refractive index $(n_e(\lambda)+n_o(\lambda))/2$ is the average of the refractive indices in the direction of X axis and in the direction Y axis and thickness of the liquid crystal material is d. Moreover, with respect to the order of the pair of liquid crystal elements, it is known that the same result are obtained in both cases, one of which the incident light firstly enters the liquid crystal element with the liquid crystal molecules aligned along the second alignment direction and another case of which the incident light firstly enters the liquid crystal element with the liquid crystal molecules aligned along the third alignment direction.

Based on above explanation, phase modulation $\Delta\emptyset(\lambda)$, occurring in a liquid crystal element group as changing from the state shown in FIG. 3(a) to the state shown in FIG. 3(b) can be expressed as in expression (4) below.

$$\Delta\emptyset(\lambda)=\emptyset_e(\lambda)-\emptyset_o(\lambda)=\pi d(n_e(\lambda)-n_o(\lambda))/\lambda \quad (4)$$

While above description explains the phase modulation between two particular states, i.e. the respective refractive indices of the pair of liquid crystal elements for the linearly polarization light having any direction of polarization plane passing through in two particular states are $n_o(\lambda)$ and $n_e(\lambda)$, and intermediate refractive index between these two particular refractive indices of $n_o(\lambda)$ and $n_e(\lambda)$ also changes in correspondence to the wavelength $\lambda$ of the incident light similar to the changing of $n_o(\lambda)$ and $n_e(\lambda)$. In a case, the alignment direction of liquid crystal molecules of one of the pair of liquid crystal elements is aligned along a direction between the first alignment direction and the second alignment direction and the tilt angle of it with the incident light advancing direction is $\alpha$, and the alignment direction of liquid crystal molecules of another of the pair of liquid crystal elements is aligned along a direction between the first alignment direction and the third alignment direction and the tilt angle of it with the incident light advancing direction is also $\alpha$, both of the effective refractive indices of each of the pair of liquid crystal elements for the light having the wavelength $\lambda$ are shown as expression (5) below.

$$n_{\mathit{eff}}(\lambda,\alpha)=1/\sqrt{[(\sin^2(\alpha)/n_e(\lambda)+(\cos^2(\alpha)/n_o(\lambda))]} \quad (5)$$

In such a state, a behavior of the pair of liquid crystal elements to the light passed through them is expressed by using Jones matrix as;

$$W_{12}(\alpha) = \begin{pmatrix} e^{-in_{X1}(\lambda,\alpha)\frac{2\pi}{\lambda}(d/2)} & 0 \\ 0 & e^{-in_{Y1}(\lambda,\alpha)\frac{2\pi}{\lambda}(d/2)} \end{pmatrix} \begin{pmatrix} e^{-in_{X2}(\lambda,\alpha)\frac{2\pi}{\lambda}(d/2)} & 0 \\ 0 & e^{-in_{Y2}(\lambda,\alpha)\frac{2\pi}{\lambda}(d/2)} \end{pmatrix}$$

Here, as both of the liquid crystal materials of the pair of liquid crystal elements are the same to each other, and as the alignment direction of the liquid crystal molecules are in a plane containing respectively the incident light propagation direction and the direction of X axis, or the incident light propagation direction and the direction of Y axis, $$n_{X1}(\lambda,\alpha)=n_{Y2}(\lambda,\alpha) \text{ and } n_{Y1}(\lambda,\alpha)=n_{X2}(\lambda,\alpha).$$

For a linear polarized light having a polarization plane direction along the X axis entering the pair of liquid crystal elements, the refractive indices for the incident light are respectively $n_{X1}(\lambda, \alpha)=n_{\mathit{eff}}(\lambda, \alpha)$ passing through the first liquid crystal element and $n_{X2}(\lambda)=n_o(\lambda)$ passing through the second liquid crystal element. Also, for a linear polarized light having a polarization plane direction along the Y axis entering the pair of liquid crystal elements, the refractive indices for the incident light are respectively $n_{Y1}(\lambda)=n_o(\lambda)$ passing through the first liquid crystal element and $n_{Y2}(\lambda)=n_{\mathit{eff}}(\lambda, \alpha)$ passing through the second liquid crystal element. Thus for the linearly polarized light having any direction of polarization plane, the refractive index for the light passing through the pair of liquid crystal elements is $n_{eff}(\lambda, \alpha)+n_o(\lambda)$, and expression (6) can be deduced:

$$W_{12} = e^{-i\left(\frac{n_{eff}(\lambda,\alpha)+n_o(\lambda)}{2}\right)\frac{2\pi}{\lambda}d}\begin{pmatrix} 1 & 0 \\ 0 & 1 \end{pmatrix} \quad (6)$$

From Expression (6), it can be deduced that the pair of liquid crystal elements of respective thickness equal d/2 is behaving like a single liquid crystal element of thickness equal to d and of refractive index equal to the average of refractive indices $(n_{eff}(\lambda, \alpha)+n_o(\lambda))/2$.

From expression (6), as oscillating components in X axis and Y axis are equal to each other, for the linearly polarized light having any direction of polarization plane passing through the pair of liquid crystal elements is $(n_{eff}(\lambda, \alpha)+n_o(\lambda))/2$. From expression (6), phase change in this state represented as expression (7) below.

$$\emptyset_e(\lambda,\alpha)=\pi d(n_{eff}(\lambda,\alpha)+n_o(\lambda))/\lambda \quad (7)$$

Namely, if each of the tilt angles with the incident light advancing direction of the pair of liquid crystal elements constituting one liquid crystal element group are the same, the phase of the light after passing through the pair of liquid crystal elements is independent from the polarization state thereof.

Next, the expression (4) representing phase modulation $\Delta\emptyset(\lambda)$ will be explained next. In a case the alignment directions of the liquid crystal molecules of the pair of liquid crystal elements changes from the state shown in FIG. 3(a) to the state shown in FIG. 3(b), the denominator of the right side of expression (4) increases as the wavelength $\lambda$ becomes greater. On the other hand, as FIG. 2 clearly indicates, as the difference between $n_e(\lambda)$ and $n_o(\lambda)$ decreases as the wavelength $\lambda$ becomes greater, the numerator of the right side of expression (4) decreases as the wavelength $\lambda$ becomes greater. Thus, the phase modulation $\Delta\emptyset(\lambda)$ decreases as the wavelength $\lambda$ becomes greater. Namely, the value representing the phase modulation $\Delta\emptyset(\lambda)$ is dependent upon the wavelength, which clearly demonstrates that achromatic phase modulation cannot be achieved via a single liquid crystal element group.

Above explanation also can be applied to the case in which the alignment directions of liquid crystal molecules of the pair of liquid crystal elements changes between the state shown in FIG. 3(c) and the state shown in FIG. 3(d).

Next, two types of different refractive index wavelength dependence characteristics will be explained. FIGS. 4(a) and 4(b) respectively present schematic graphs showing the relationships between two kinds of refractive indices and wavelength for two types of liquid crystal materials 1 and 2 whose refractive index wavelength dependence characteristics are different from each other. In each of these graphs, the solid line on the lower side represents the ordinary refractive index $n_o(\lambda)$ of the liquid crystal material with the alignment direction of the liquid crystal molecules assuming in the first alignment direction and the solid line on the upper side represents the extraordinary refractive index $n_e(\lambda)$ of the liquid crystal material with the liquid crystal molecules assuming in the second or third alignment direction.

As FIG. 4(a) indicates, both of the ordinary refractive indices $n_o(\lambda)$ and $n_e(\lambda)$ of the liquid crystal material 1 change only to relatively small extents even as the wavelength $\lambda$ changes. This means that the difference between $n_e(\lambda)$ and $n_o(\lambda)$ does not change greatly even as the wavelength $\lambda$ changes, either. On the other hand as FIG. 4(b) indicates, the ordinary refractive indices $n_o(\lambda)$ and $n_e(\lambda)$ of the liquid crystal material 2 change to greater extents as the wavelength $\lambda$ changes, compared to the extents of change in the refractive indices of the liquid crystal material 1. The extraordinary refractive index $n_e(\lambda)$ changes particularly greatly as the wavelength $\lambda$ changes. Thus, as the wavelength $\lambda$ increases, the difference between $n_e(\lambda)$ and $n_o(\lambda)$ decreases to a greater extent.

The achromatic phase modulator according to one of the embodiment of the present invention is achieved by configuring a phase modulator with at least the first liquid crystal element group composed of a pair of liquid crystal elements with liquid crystal material having the first refractive index wavelength dependence characteristics and the second liquid crystal element group composed of a pair of liquid crystal elements with liquid crystal material having the second refractive index wavelength dependence characteristics. Namely, the achromatic phase modulator according to the embodiment of the present invention is achieved by configuring a phase modulator with at least four liquid crystal elements. In each of the first and second liquid crystal element groups, thicknesses the liquid crystal layers of each of the pair of liquid crystal elements are substantially the same to each other. Total thickness of the liquid crystal layers of the liquid crystal material 1 is assumed to be $d_1$ and total thickness of the layers of the liquid crystal material 2 is assumed to be $d_2$.

Figure 5:
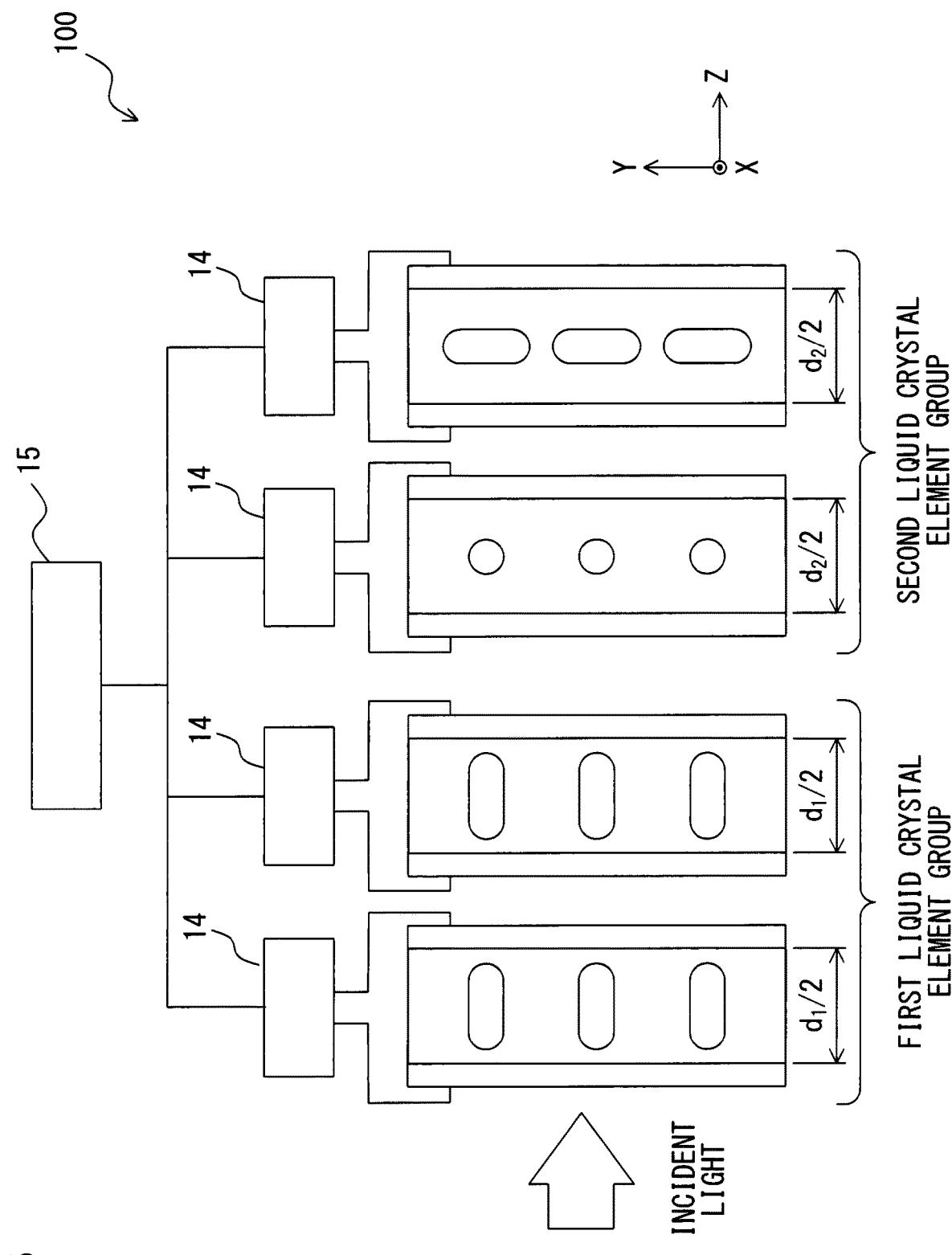
FIG. 5 is a schematic diagram showing the structure of an achromatic phase modulator according to one embodiment of the present invention, which is configured with two sets of liquid crystal element groups.

FIG. 5 shows an achromatic phase modulator 100 configured as described above. In FIG. 5, X axis is to be set in a direction perpendicular to the drawing sheet, Y axis is to be set in a direction parallel to the drawing sheet, and Z axis is to be set in a direction along the incident light advancing. Two sets of liquid crystal element groups, the first liquid crystal element group composed of the pair of liquid crystal elements using the liquid crystal material 1 and the second liquid crystal element group composed of the pair of liquid crystal elements using the liquid crystal material 2, are disposed in series in the phase modulator 100. Thicknesses of both of the liquid crystal material layers in each of the pair of liquid crystal elements constituting the first liquid crystal element group are $d_1/2$ and both of the liquid crystal material layers of each of the pair of liquid crystal elements constituting the second liquid crystal element group are $d_2/2$. Plurality of power sources 14 are connected to each of the liquid crystal elements so as to provide drive electric signals to be applied to the individual liquid crystal elements. The drive electric signals applied from the power sources 14 to the individual liquid crystal elements are controlled by a control device 15. It is to be noted that there are no restrictions whatsoever with regard to the order in which the liquid crystal elements are disposed. In other words, the incident light may enter either of these liquid crystal elements first.

As mentioned above, in each liquid crystal element, the alignment direction of liquid crystal molecules therein can be altered between the first alignment direction substantially equal to the direction which the incident light advances and the second alignment direction perpendicular to the first alignment direction, or between the first alignment direction and the third direction perpendicular to both of the first alignment direction and the second alignment direction.

To achieve achromatic phase modulation, the changes in the effective refractive indices must occur along opposite directions at the pair of liquid crystal elements constituting the first liquid crystal element group and the pair of liquid crystal elements constituting the second liquid crystal element group. Namely, in conducting on achieving a phase modulation, the effective refractive index at the pair of liquid crystal elements constituting the second liquid crystal element group needs to decrease if the effective refractive index at the pair of liquid crystal elements constituting the first liquid crystal element group is to increase, whereas the effective refractive index at the pair of liquid crystal elements constituting the second liquid crystal element group needs to increase if the effective refractive index at the pair of liquid crystal elements constituting the first liquid crystal element group is to decrease. FIGS. 6(a) and 6(b) show how the liquid crystal molecules may behave in this situation. In FIGS. 6(a) and 6(b), X axis is to be set in a direction perpendicular to the drawing sheet, Y axis is to be set in a direction parallel to the drawing sheet, and Z axis is to be set in a direction along the incident light advancing.

In the state shown in FIG. 6(a), the pair of liquid crystal elements constituting the first liquid crystal element group represent in liquid crystal elements 1-1 and 1-2 and the pair of liquid crystal elements constituting the second liquid crystal element group represent in liquid crystal elements 2-1 and 2-2. The alignment direction of liquid crystal molecules in the liquid crystal element 1-1 represents a direction slightly displaced from the first alignment direction toward the third alignment direction. The alignment direction of liquid crystal molecules in the liquid crystal element 1-2 represents a direction slightly displaced from the first alignment direction toward the second alignment direction. Tilt angles of the liquid crystal molecules in the liquid crystal elements 1-1 and 1-2 with the incident light advancing direction are substantially the same to each other. The alignment direction of liquid crystal molecules in the liquid crystal element 2-1 represents a direction slightly displaced from the second alignment direction toward the first alignment direction. The alignment direction of liquid crystal molecules in the liquid crystal element 2-2 represents a direction slightly displaced from the third alignment direction toward the first alignment direction. Tilt angles of the liquid crystal molecules in the liquid crystal elements 2-1 and 2-2 with the incident light advancing direction are substantially the same to each other.

In the state shown in FIG. 6(b), the alignment direction of liquid crystal molecules in the liquid crystal element 1-1 represents a direction slightly displaced from the third alignment direction toward the first alignment direction. The alignment direction of liquid crystal molecules in the liquid crystal element 1-2 represents a direction slightly displaced from the second alignment direction toward the first alignment direction. Tilt angles of the liquid crystal molecules in the liquid crystal elements 1-1 and 1-2 with the incident light advancing direction are substantially the same to each other. The alignment direction of liquid crystal molecules in the liquid crystal element 2-1 represents a direction slightly displaced from the first alignment direction toward the second alignment direction. The alignment direction of liquid crystal molecules in the liquid crystal element 2-2 represents a direction slightly displaced from the first alignment direction toward the third alignment direction. Tilt angles of the liquid crystal molecules in the liquid crystal elements 2-1 and 2-2 with the incident light advancing direction are substantially the same to each other.

For achieving achromatic phase modulation, individual drive electric signals are applied to individual liquid crystal elements. Thereby, the alignment directions of liquid crystal molecules in these liquid crystal elements change from the state shown in FIG. 6(a) to the state shown in FIG. 6(b).

The effective refractive index changes at each of the liquid crystal elements will be explained by referring to FIGS. 4(a) and 4(b). For light having a wavelength $\lambda_1$, the effective refractive index at the pair of liquid crystal elements constituting the first liquid crystal element group are increased from $n_{11}(\lambda_1)$ to $n_{12}(\lambda_1)$, whereas the effective refractive index at the pair of liquid crystal elements constituting the second liquid crystal element group are decreased from $n_{21}(\lambda_1)$ to $n_{22}(\lambda_1)$. These changes in the effective refractive indices are indicated by the arrows marked $x_1$ and $y_1$ in FIGS. 4(a) and 4(b) respectively.

At the same time, for light having a wavelength $\lambda_2$ which is larger than $\lambda_1$, the effective refractive index at the pair of liquid crystal elements constituting the first liquid crystal element group are increased from $n_{11}(\lambda_2)$ to $n_{12}(\lambda_2)$, whereas the refractive index at the pair of liquid crystal elements constituting the second liquid crystal element group are decreases from $n_{21}(\lambda_2)$ to $n_{22}(\lambda_2)$. These changes in the refractive indices are indicated by the arrows marked $x_2$ and $y_2$ in FIGS. 4(a) and 4(b) respectively.

Assuming the thicknesses of the liquid crystal material layers in each of the pair of liquid crystal elements constituting the first liquid crystal element group and the thicknesses of the liquid crystal material layers in each of the pair of liquid crystal elements constituting the second liquid crystal element group are respectively set to $d_1/2$ and $d_2/2$, the phase modulations for the wavelength component of $\lambda_1$ of incoming light $\Delta\varnothing_1(\lambda_1)$ achieved via the liquid crystal elements constituting the first liquid crystal element group is expressed as;

$$\Delta\varnothing_1(\lambda_1) = 2[(n_{12}(\lambda_1) - n_{11}(\lambda_1))d_1]/\lambda_1$$

In a similar way, the phase modulations for the wavelength component of $\lambda_1$ of incoming light $\Delta\varnothing_2(\lambda_1)$ achieved via the liquid crystal elements constituting the second liquid crystal element group is expressed as;

$$\Delta\varnothing_2(\lambda_1) = 2\pi[(n_{22}(\lambda_1) - n_{21}(\lambda))d_2]/\lambda_1$$

Thus, sum of these modulations $\Delta\varnothing(\lambda_1)$ is expressed as;

$$\Delta\varnothing(\lambda_1) = \varnothing_1(\lambda_1) + \Delta\varnothing_2(\lambda_1) \quad (8)$$
$$= 2\pi[(n_{12}(\lambda_1) - n_{11}(\lambda_1))d_1 + (n_{22}(\lambda_1) - n_{21}(\lambda_1))d_2]/\lambda_1$$
$$= 2\pi(x_1 d_1 + y_1 d_2)/\lambda_1$$

Likewise, the phase modulation for the wavelength component of $\lambda_2$ of incoming light $\Delta\varnothing(\lambda_2)$ is expressed as;

$$\Delta\varnothing(\lambda_2) = 2\pi[(n_{12}(\lambda_2) - n_{11}(\lambda_2))d_1 + (n_{22}(\lambda_2) - n_{21}(\lambda_2))d_2]/\lambda_2 = 2\pi(x_2 d_1 + y_2 d_2)/\lambda_2 \quad (9)$$

It is to be noted that as already explained for $\lambda_1 < \lambda_2$, for the liquid crystal material 1 and the liquid crystal material 2 in the present embodiment:

$$x_1 = n_{12}(\lambda_1) - n_{11}(\lambda_1) > 0$$

$$y_1 = n_{22}(\lambda_1) - n_{21}(\lambda_1) < 0$$

$$x_2 = n_{12}(\lambda_2) - n_{11}(\lambda_2) > 0$$

$$y_2 = n_{22}(\lambda_2) - n_{21}(\lambda_2) < 0$$

Also, $$x_1 - x_2 > 0$$

$$y_1 - y_2 < 0$$

As FIGS. 4(a) and 4(b) clearly indicate, the difference between $x_1$ and $x_2$ is small but the difference between $y_1$ and $y_2$ is significantly large in comparison. This means that a condition expressed as; $x_1+y_1<x_2+y_2$ can exist. By transposing $x_2$ and $y_1$ this expression can be rewritten as; $x_1-x_2<y_2-y_1$.

This expression indicates that the total thickness $d_1$ of the liquid crystal material layers having the first refractive index wavelength dependence characteristics and the total thickness $d_2$ of the liquid crystal material layers having the second refractive index wavelength dependence characteristics can be set so as to satisfy a condition expressed as;

$$(x_1-x_2)d_1<(y_2-y_1)d_2 \tag{10}$$

Namely, $d_1$ and $d_2$ can be set so that $(x_1-x_2)/(y_2-y_1)<d_2/d_1$ is satisfied.

Expression (10) indicates that $(x_2d_1+y_2d_2)$ in expression (9) is greater than $(x_1d_1+y_1d_2)$ in expression (8). In other words, the numerator in expression (9) for the phase modulation achieved for light having the greater wavelength $\lambda_2$ is greater than the numerator in expression (8) for the phase modulation achieved for light having the smaller wavelength $\lambda_1$. Thus, a conclusion is drawn that $x_1$, $y_1$, $x_2$, $y_2$, $d_1$ and $d_2$ can be set so as to equalize $(x_1d_1+y_1d_2)/(x_2d_1+y_2d_2)$ to $\lambda_1/\lambda_2$. Namely, $x_1$, $y_1$, $x_2$ and $y_2$, through the choice of the two liquid crystals materials and the two designed wavelengths, $d_1$ and $d_2$ can be set (by solving the two equation linear system with two remaining unknown values) so that below expression (11) is satisfied.

$$(x_1d_1+y_1d_2)/(x_2d_1+y_2d_2)=\lambda_1/\lambda_2 \tag{11}$$

When expression (11) is satisfied, $\Delta\varnothing(\lambda_1)=\Delta\varnothing(\lambda_2)$, it means that achromatic phase modulation is achieved for at least two wavelength.

As described above, achromatic phase modulation can be achieved by selecting the optimal values for the thicknesses of the liquid crystal material layers having the first refractive index wavelength dependence characteristics and the second refractive index wavelength dependence characteristics, the optimal refractive index wavelength dependence characteristics to be manifested by these liquid crystal materials and the optimal settings for the changes in the refractive effective indices at the liquid crystal elements. It is to be noted that the extents of change in the effective refractive indices at the liquid crystal elements may be set by, for instance, controlling the voltages applied to the liquid crystal elements.

While achromatic phase modulation is achieved in conjunction with light at two particular different wavelengths $\lambda_1$, and $\lambda_2$ in the example described above, achromatic phase modulation may also be achieved in conjunction with a greater number of wavelengths. For instance, achromatic phase modulation for a maximum phase shift level of $2\pi$rad may be achieved with the phase modulation error attributable to the varying wavelengths kept down to a value equal to or less than $0.1\pi$rad for light with wavelengths over the visible light wavelength range of 400 nm through 700 nm.

Even more accurate achromatic phase modulation can be achieved with a phase modulator configured with a greater number of liquid crystal element groups. For instance, an achromatic phase modulator configured with three sets of liquid crystal element groups will assure even less error attributable to the varying wavelengths. In this configuration, control should be executed for the phase modulation so that the effective refractive indices at two pairs of liquid crystal elements constituting two sets of liquid crystal element groups among the three sets of liquid crystal element groups change in a manner opposite to that with which the effective refractive indices at a pair of liquid crystal elements constituting the remaining one liquid crystal element group change. Namely, if the effective refractive indices at the pairs of liquid crystal elements respectively constituting the two sets of liquid crystal element groups are to increase, the effective refractive indices at the pair of liquid crystal elements constituting the remaining one liquid crystal element group should decrease, whereas if the effective refractive indices at the pairs of liquid crystal elements respectively constituting the two sets of liquid crystal element groups are to decrease, the effective refractive indices at the pair of liquid crystal elements constituting the remaining one liquid crystal element group should increase.

Figure 7:
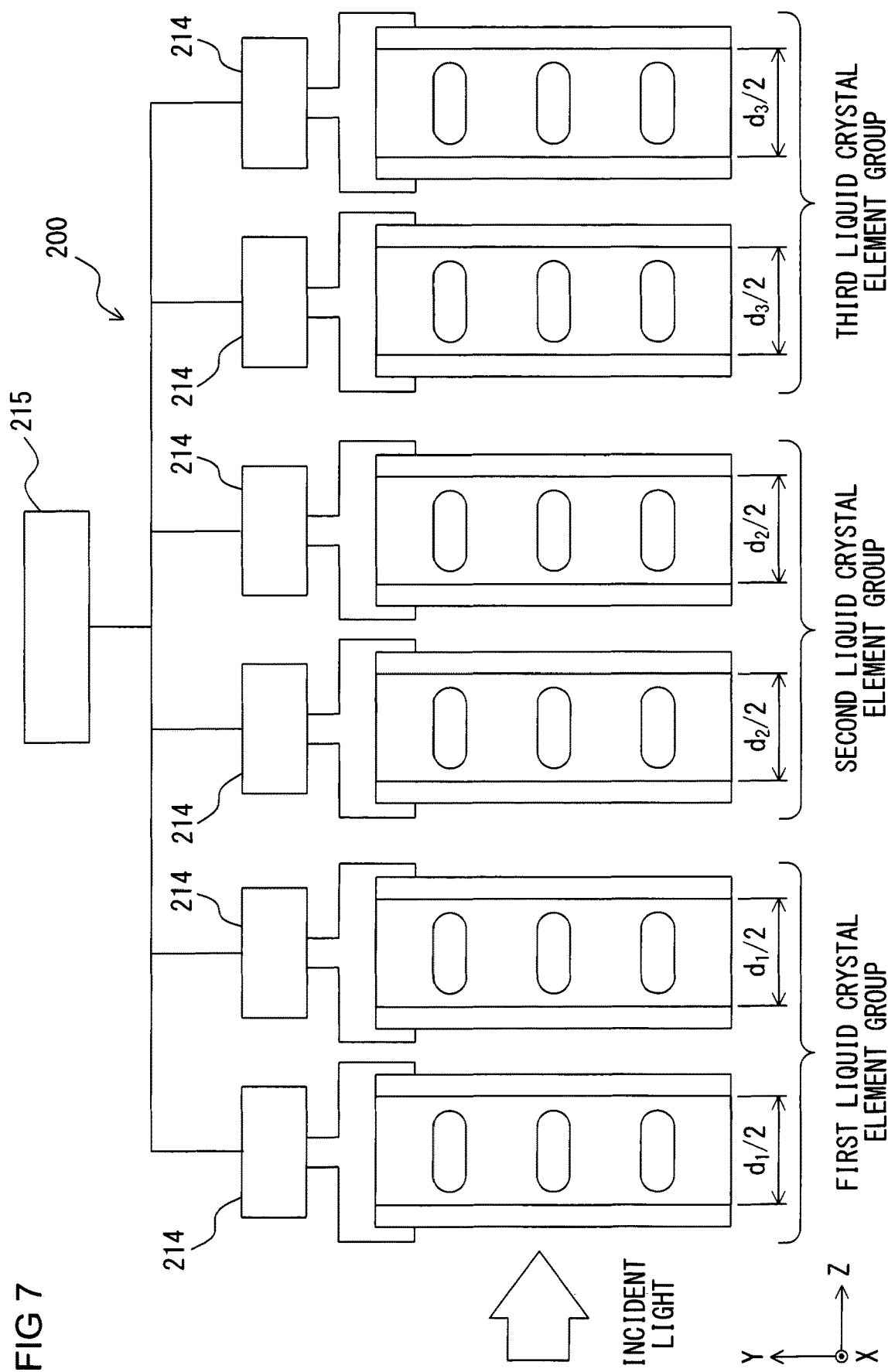
FIG. 7 is a schematic diagram showing the structure of an achromatic phase modulator according to one embodiment of the present invention, which is configured with three sets of liquid crystal element groups.

FIG. 7 shows an example of an achromatic phase modulator 200 composed of six liquid crystal elements of three sets of liquid crystal element groups. In FIG. 7, X axis is to be set in a direction perpendicular to the drawing sheet, Y axis is to be set in a direction parallel to the drawing sheet, and Z axis is to be set in a direction along the incident light advancing. The achromatic phase modulator 200 includes three sets of liquid crystal element groups of liquid crystal elements 1-1, 1-2, 2-1, 2-2, 3-1 and 3-2. The power sources 214 are connected to each of these liquid crystal elements for applying voltages to them. The voltages applied from the power sources 214 to each of the liquid crystal elements are controlled by the control device 215. It is to be noted that there are no restrictions whatsoever with regard to the order in which these liquid crystal elements are disposed. In other words, the incident light may enter either of these liquid crystal elements first.

Assuming that the thicknesses of both of the liquid crystal material layers of the liquid crystal elements 1-1 and 1-2 constituting the first liquid crystal element group are $d_1/2$, the thicknesses of both of the liquid crystal material layers of the liquid crystal elements 2-1 and 2-2 constituting the second liquid crystal element group are $d_2/2$, and the thicknesses of both of the liquid crystal material layers of the liquid crystal elements 3-1 and 3-2 constituting the third liquid crystal element group are $d_3/2$. The phase modulation for the wavelength component of $\lambda_1$ of incoming light $\Delta\varnothing(\lambda_1)$ achieved via these six liquid crystal elements of three sets of liquid crystal element groups, by altering the effective refractive indices of the liquid crystal materials so that from $n_{11}(\lambda_1)$ to $n_{12}(\lambda_1)$ at the both of liquid crystal elements constituting the first liquid crystal group, from $n_{21}(\lambda_1)$ to $n_{22}(\lambda_1)$ at the both of liquid crystal elements constituting the second liquid crystal group, and from $n_{31}(\lambda_1)$ to $n_{32}(\lambda_1)$ at the both of liquid crystal elements constituting the third liquid crystal group, is expressed as;

$$\Delta\varnothing(\lambda_1)=2\pi(x_1d_1+y_1d_2+z_1d_3)/\lambda_1 \tag{12}$$

$x_1$, $y_1$ and $z_1$ in the expression above respectively represent $n_{12}(\lambda_1)-n_{11}(\lambda_1)$, $n_{22}(\lambda_1)-n_{21}(\lambda_1)$ and $n_{32}(\lambda_1)-n_{31}(\lambda_1)$.

In the same time, the phase modulation for the wavelength component of $\lambda_2$ of incoming light $\Delta\varnothing(\lambda_2)$ achieved via these six liquid crystal elements of three sets of liquid crystal element groups is expressed as;

$$\Delta\varnothing(\lambda_2)=2\pi(x_2d_1+y_2d_2+z_2d_3)/\lambda_2 \tag{13}$$

$x_2$, $y_2$ and $z_2$ in the expression above respectively represent $n_{12}(\lambda_2)-n_{11}(\lambda_1)$, $n_{22}(\lambda_2)-n_{21}(\lambda_2)$ and $n_{32}(\lambda_2)-n_{31}(\lambda_2)$.

In the same time, the phase modulation for the wavelength component of $\lambda_3$ of incoming light $\Delta\varnothing(\lambda_3)$ achieved via these six liquid crystal elements of three sets of liquid crystal element groups is expressed as;

$$\Delta\varnothing(\lambda_3)=2\pi(x_3d+y_3d_2+z_3d_3)/\lambda_3 \tag{14}$$

$x_3$, $y_3$ and $z_3$ in the expression above respectively represent $n_{12}(\lambda_3)-n_{11}(\lambda_3)$, $n_{22}(\lambda_3)-n_{21}(\lambda_3)$ and $n_{32}(\lambda_3)-n_{31}(\lambda_3)$.

From expressions (12), (13) and (14), optimal values are selected for $x_1$, $y_1$, $z_1$, $x_2$, $y_2$, $z_2$, $x_3$, $y_3$ and $z_3$, through the choice of the three liquid crystals materials and the three designed wavelengths, and $d_1$, $d_2$ and $d_3$ (by solving the linear equation systems of three equations and three remaining unknown values) so as to achieve a relationship expressed as;

$$(x_1 d_1 + y_1 d_2 + z_1 d_3)/\lambda_1 = (x_2 d_1 + y_2 d_2 + z_2 d_3)/\lambda_2 = (x_3 d_1 + y_3 d_2 + z_3 d_3)/\lambda_3 \quad (15)$$

When expression (15) is satisfied, Through this process, conditions under which achromatic phase modulation is achieved are determined. It is to be noted that the six liquid crystal elements of three sets of liquid crystal element groups may be disposed in any order.

Embodiment 1: Simulation of an Achromatic Phase Modulator with Two Sets of Liquid Crystal Element Groups

[Selection of Liquid Crystal Materials]

Figure 8:
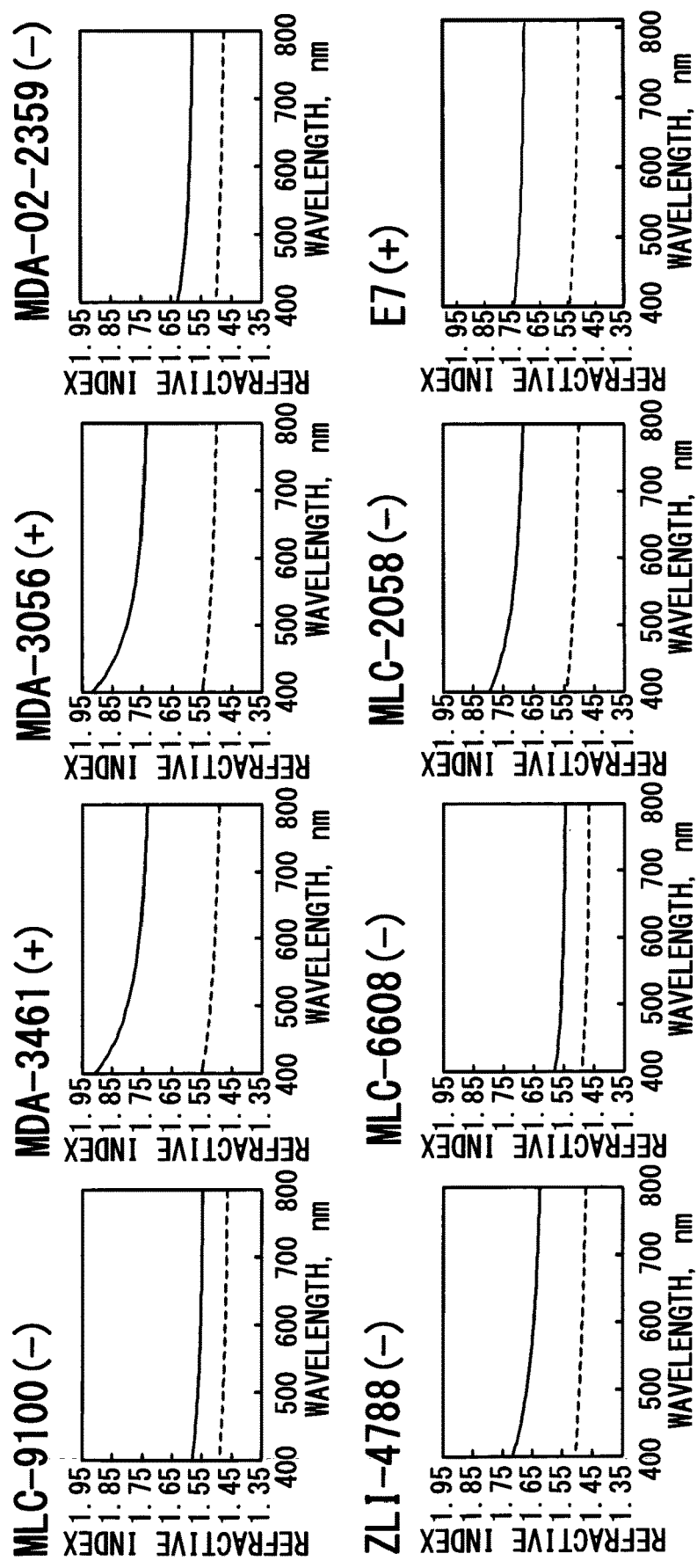
FIG. 8 presents graphs indicating several examples of the refractive index wavelength dependence characteristics of liquid crystal material.

Various nematic liquid crystal materials are prepared. Each refractive index wavelength dependence characteristics of these liquid crystal materials depends on both of the ordinary refractive index $n_o(\lambda)$ in the state in which the liquid crystal molecules are aligned along the direction parallel to the light advancing direction, and the extraordinary refractive index $n_e(\lambda)$ in the state in which the liquid crystal molecules are aligned along the direction perpendicular to the light advancing direction. Such refractive index wavelength dependence characteristics can be described using Cauchy's dispersion formula. FIG. 8 presents several examples of the refractive index wavelength dependence characteristics that may be determined as described above in schematic representation.

Next, two kinds of liquid crystal materials among these liquid crystal materials are selected and the thicknesses of the individual liquid crystal material layers of hypothetical liquid crystal elements composed of these two kinds of liquid crystal materials respectively for the liquid crystal elements constituting the first liquid crystal element group and for the liquid crystal elements constituting the second liquid crystal element group are determined through calculation for a maximum phase modulation $2\pi$.

In more specific terms, values for $d_1$ and $d_2$ are calculated by ensuring that the relationship expressed in (16) below for achieving a maximum phase shift $2\pi$rad is satisfied at two designed wavelengths, for, instance $\lambda=400$ nm and $\lambda=600$ nm, by altering the effective refractive index from $n_o(\lambda)$ to $n_e(\lambda)$ at the liquid crystal elements constituting in one liquid crystal element group and from $n_e(\lambda)$ to $n_o(\lambda)$ at the liquid crystal elements constituting in the other liquid crystal element group. As the values of $\Delta n_1(\lambda)$ and $\Delta n_2(\lambda)$ are known at both $\lambda=400$ nm and $\lambda=600$ nm, the values for $d_1$ and $d_2$ can be precisely calculated so that the expression (16) is verified at both wavelengths.

$$2\pi(\Delta n_1(\lambda)d_1 + \Delta n_2(\lambda)d_2)/\lambda = 2\pi \quad (16)$$

$\Delta n_1(\lambda)$ and $\Delta n_2(\lambda)$ in the expression above are rewritten as;

$$\Delta n_1(\lambda) = n_{1e}(\lambda) - n_{1o}(\lambda) \text{ or } n_{1o}(\lambda) - n_{1e}(\lambda)$$

$$\Delta n_2(\lambda) = n_{2e}(\lambda) - n_{2o}(\lambda) \text{ or } n_{2o}(\lambda) - n_{2e}(\lambda)$$

$n_{1e}(\lambda) - n_{1o}(\lambda)$ and $n_{2e}(\lambda) - n_{2o}(\lambda)$ both take positive values, whereas $n_{1o}(\lambda) - n_{1e}(\lambda)$ and $n_{2o}(\lambda) - n_{2e}(\lambda)$ both take negative values.

As explained above, values of $d_1$ and $d_2$ respectively represent the total thicknesses of the liquid crystal material layers of the liquid crystal elements each respectively constituting the first and the second liquid crystal element groups. Namely, value of $d_1/2$ represents the thickness of the liquid crystal layer of each of the liquid crystal elements constituting the first liquid crystal element group and value of $d_2/2$ represents the thickness of the liquid crystal layer of each of the liquid crystal elements constituting the second liquid crystal element group.

As FIG. 8 clearly indicates, the absolute values of both $\Delta n_1(\lambda)$ and $\Delta n_2(\lambda)$ become smaller as the wavelength increases. In other words, the absolute values of both $\Delta n_1(\lambda)$ and $\Delta n_2(\lambda)$ decrease as the denominator $\lambda$ on the left side of expression (16) increases. Thus, if $\Delta n_1(\lambda)$ and $\Delta n_2(\lambda)$ both take positive values or negative values, the extent of phase modulation decreases as $\lambda$ becomes greater, and under such circumstances, the relationship expressed in (16) cannot be achieved. On the other hand, if either $\Delta n_1(\lambda)$ and $\Delta n_2(\lambda)$ takes a positive value and the other takes a negative value, conditions that allow the relationship expressed in (16) to be true exist, as has been explained in reference to FIGS. 4(a) and 4(b).

In order to determine the values for $d_1$ and $d_2$, the following two expressions are obtained with respect to $d_1$ and $d_2$ by using two wavelengths 400 nm and 600 nm substituting for the wavelengths and substituting the values corresponding to these wavelengths for $\Delta n_1(\lambda)$ and $\Delta n_2(\lambda)$ in expression (16).

$$(\Delta n_1(400)d_1 + \Delta n_2(400)d_2) = 400 \text{ (nm)} \quad (17)$$

$$(\Delta n_1(600)d_1 + \Delta n_2(600)d_2) = 600 \text{ (nm)} \quad (18)$$

Since the values for $\Delta n_1(400)$, $\Delta n_2(400)$, $\Delta n_1(600)$ and $\Delta n_2(600)$ have already been determined through the calculation executed as expressed in Cauchy's dispersion formula, as has been explained earlier, the values for $d_1$ and $d_2$ can be calculated by using expression (17) and expression (18). Through this process, the total thicknesses of the individual liquid crystal material layers can be calculated in correspondence to any combination of two different liquid crystal materials.

Then, each combination of two different liquid crystal materials and total thicknesses of the corresponding liquid crystal material layers, which satisfy the following conditions, are selected by scrutinizing the plurality of combinations.

(i) The phase modulation error does not exceed 8% for maximum phase modulation set to $2\pi$rad over the visible range from 400 nm to 700 nm.

(ii) The thickness of liquid crystal material layer of all the liquid crystal elements does not exceed 30 μm.

It is to be noted that the condition (ii) above is set since response times of liquid crystal elements increases with liquid crystal material thickness.

Among the combinations fulfilling the conditions defined above, the combination of two liquid crystal materials, MDA-02-2359 (manufactured by Merck) for the pair of liquid crystal elements constituting the first liquid crystal element group and E7 (manufactured by Merck) for the pair of liquid crystal elements constituting the second liquid crystal element group, is selected for the achromatic phase modulator. The refractive index wavelength dependence characteristics of these liquid crystal materials are shown in FIG. 8. The total thicknesses $d_1$ and $d_2$ of the liquid crystal material layers in this combination of these two liquid crystal materials are calculated to be 28.33 μm for the MDA-02-2359 and 11.06 µm for the E7 respectively. Namely, the thicknesses of the liquid crystal layers of each pair of liquid crystal elements constituting the first liquid crystal element group are both 14.165 m and the thicknesses of the liquid crystal layers of each pair of liquid crystal elements constituting the second liquid crystal element group are both 5.53 µm.

The refractive index differences, for each of the liquid crystal elements constituting the first liquid crystal element group (MDA-02-2359) in one of which the alignment direction changes from the first alignment direction to the second alignment direction and in the other of which the alignment direction changes from the first alignment direction to the third alignment direction is $$\Delta n_1(\lambda) = n_{1e}(\lambda) - n_{1o}(\lambda) > 0$$

Whereas, the refractive index differences, for each of the liquid crystal elements constituting the second liquid crystal element group (E7) in one of which the alignment direction changes from the second alignment direction to the first alignment direction and in the other of which the alignment direction changes from the third alignment direction to the first alignment direction is $$\Delta n_2(\lambda) = n_{2o}(\lambda) - n_{2e}(\lambda) < 0$$

The modulation between two modulation conditions of the first modulation condition and the second modulation condition will be explained below. Assuming that, in the first modulation condition, the alignment directions of liquid crystal molecules (MDA-02-2359) in the pair of liquid crystal elements constituting the first liquid crystal element group are both in the first alignment direction, and the alignment directions of liquid crystal molecules (E7) of the pair of liquid crystal elements constituting the second liquid crystal element group are respectively in the second alignment direction and the third alignment direction. Because MDA-02-2359 has a negative dielectric anisotropy (N-type) and E7 has a positive dielectric anisotropy (P-type), it is not necessary to apply voltages to any of the liquid crystal elements.

Assuming that, in the second modulation condition, the alignment directions of liquid crystal molecules (MDA-02-2359) of the pair of liquid crystal elements constituting the first liquid crystal element group are respectively in the second alignment direction and the third alignment direction, and the alignment directions of liquid crystal molecules (E7) of the pair of liquid crystal elements constituting the second liquid crystal element group are both in the first alignment direction. The control unit applies substantially the same control electric signals to each of the pair of liquid crystal elements constituting in each of the liquid crystal elements. Namely, the control unit applies substantially the same control electric signals to each of the pair of liquid crystal elements constituting the first liquid crystal element group. Similarly, the control unit applies substantially the same control electric signals to each of the pair of liquid crystal elements constituting the second liquid crystal element group.

[Simulation]

Control of the individual liquid crystal elements in the phase modulator configured by disposing a total of four liquid crystal elements in series constituting two sets of liquid crystal element groups will be next explained. In the range of zero and the maximum phase modulation of $2\pi$rad, changes in the effective refractive indices of the liquid crystal elements required to achieve the particular extent of phase modulation are determined through repeated calculation executed to minimize the phase modulation error attributable to change of wavelength. There is a plurality of methods through which such effective refractive index changes can be determined. For instance, the effective refractive index of the liquid crystal element can be calculated from any alignment direction of the liquid crystal molecules (expression (5)). In more specific terms, for any particular extent of phase modulation $\Delta \varnothing_k$ between zero and the maximum phase modulation of $2\pi$rad, the first modulation condition remains the same. Namely, the alignment directions of liquid crystal molecules (MDA-02-2359) of the pair of liquid crystal elements constituting the first liquid crystal element group are both in the first alignment direction, and the alignment directions of liquid crystal molecules (E7) of the pair of liquid crystal elements constituting the second liquid crystal element group are respectively in the second alignment direction and the third alignment direction. This first alignment condition is called an initial condition.

To determine the second modulation condition for a particular extent of phase modulation $\Delta \varnothing_k$, optimal effective refractive indices for the liquid crystal elements constituting the first liquid crystal element group and the liquid crystal elements constituting the second liquid crystal element group can be calculated so as to minimize the phase modulation error for light having wavelengths at both 400 nm and 600 nm. At this time, tilt angles of the liquid crystal molecule directions with the incident light advancing direction in pair of the liquid crystal elements constituting each of the liquid crystal element groups are to be identical with each other. Namely, in this time, the refractive indices thereof are identical. Accordingly, the phase modulation $\Delta \varnothing_k$, occurring as the alignment of the liquid crystal molecules, initially sustaining the first modulation condition, changes to the second modulation condition, can be expressed as in the expression (19) below.

$$2\pi(\Delta n_1(\lambda,\alpha_1)d_1 + \Delta n_2(\lambda,\alpha_2)d)/\lambda = \Delta \varnothing_k \quad (19)$$

here, $$\Delta n_1(\lambda) = n_{1\mathit{eff}}(\lambda,\alpha_1) - n_{1o}(\lambda) > 0$$

$$\Delta n_2(\lambda) = n_{2\mathit{eff}}(\lambda,\alpha_2) - n_{2e}(\lambda) < 0$$

Here, $\alpha_1$ and $\alpha_2$ are respectively tilt angles of the liquid crystal molecules with the incident light advancing direction in the liquid crystal elements constituting the first and second liquid crystal element groups to the light advancing direction at the second modulation condition. The effective refractive index $n_{\mathit{eff}}(\lambda, \alpha)$ is described by the expression (5). The phase modulation error is the absolute difference between $2\pi(\Delta n_1(\lambda,\alpha_1)d_1 + \Delta n_2(\lambda,\alpha_1)d_2)/\lambda$ and $\Delta \varnothing_k$ in expression (18). In practice, repeated calculations are executed to minimize the phase modulation error at the designed wavelengths of 400 nm and 600 nm. The optimization of the effective refractive indices of liquid crystal elements constituting the first liquid crystal element group and the effective refractive indices of liquid crystal elements constituting the second liquid crystal element group is realized through the adjustment of the tilt angles of liquid crystal molecules $\alpha_1$ and $\alpha_2$.

Figure 9:
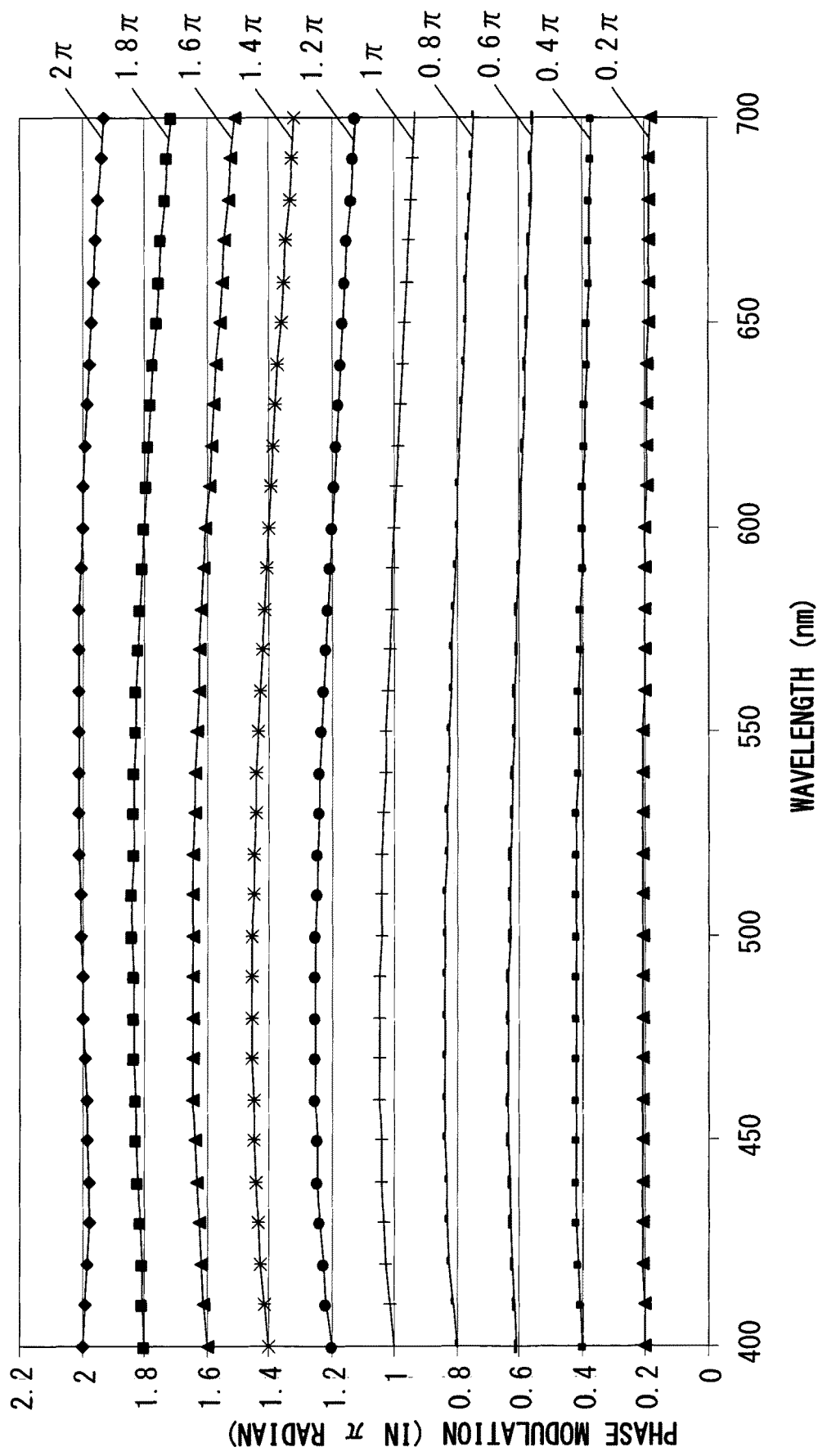
FIG. 9 presents calculation results pertaining to the phase modulation achieved by two sets of liquid crystal element groups.
Figure 10:
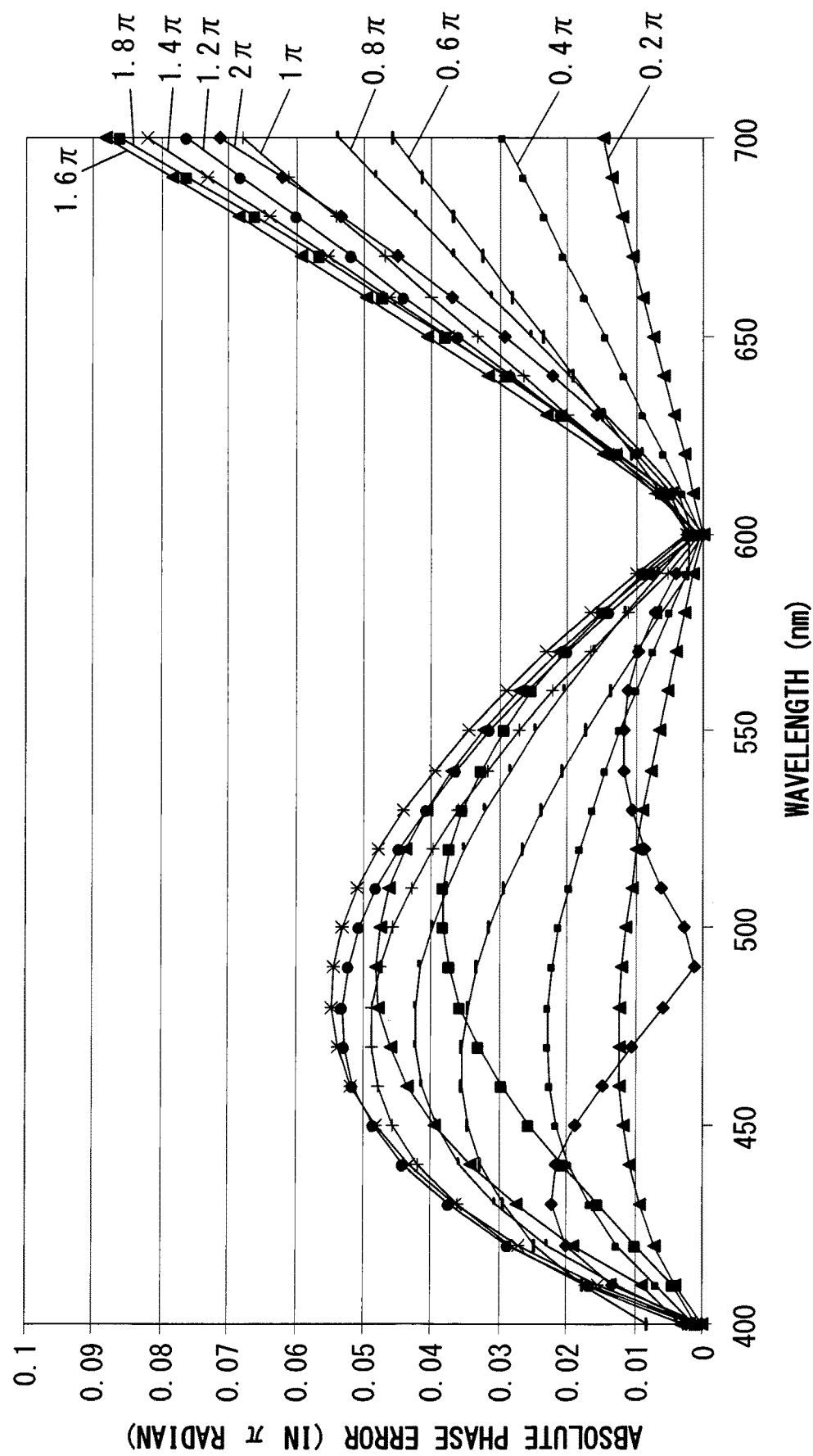
FIG. 10 presents calculation results pertaining to the error in the phase modulation achieved via two sets of liquid crystal element groups.

For a combination calculated as described above, simulations for phase modulation at various wavelengths of light in a range of 400 nm through 700 nm are conducted. To calculate maximum phase modulation of $2\pi$rad, both the ordinary refractive index $n_o(\lambda)$ and the extraordinary refractive index $n_e(\lambda)$, already obtained by Cauchy's dispersion formula, are used. To determine any phase modulation other than the maximum phase modulation of 2π rad, repeated alternations of the effective refractive index are calculated to minimize phase modulation error. The result of simulation in this manner for phase modulation of 0πrad through 2π with 0.2π increments over a wavelength range of 400 nm through 700 nm is shown in FIG. 9. Moreover, the calculated absolute phase errors are shown in FIG. 10. It should be noted that, although the optimization was carried at the wavelengths of 400 nm and 600 nm, the absolute phase shift errors for the different increments of phase shift modulation do not exceed 0.1πrad over the wavelength range from 400 nm to 700 nm.

Embodiment 2: Simulation of an Achromatic Phase Modulator with Three Sets of Liquid Crystal Element Groups

[Selection of Liquid Crystal Materials]

As explained in Embodiment 1, three liquid crystal materials among the plurality of liquid crystal materials refractive index dependence characteristics thereof were known. The thicknesses of the individual liquid crystal material layers of hypothetical liquid crystal elements composed of these three liquid crystal materials respectively for the liquid crystal elements constituting the first liquid crystal element group, the liquid crystal elements constituting the second liquid crystal element group and the liquid crystal elements constituting the third liquid crystal element group are determined through calculation for a maximum phase modulation of 2π.

In more specific terms, values for $d_1$, $d_2$ and $d_3$ are calculated by ensuring that the relationship expressed in (20) below for achieving a maximum phase shift 2πrad is satisfied at three designed wavelengths, for, instance λ=400 nm, λ=500 nm and λ=660 nm, by altering the effective refractive index from $n_o(\lambda)$ to $n_e(\lambda)$ at the pair of liquid crystal elements constituting two sets of liquid crystal element groups and from $n_e(\lambda)$ to $n_o(\lambda)$ at the pair of liquid crystal elements constituting remaining liquid crystal element group. As the values of $\Delta n_1(\lambda)$, $\Delta n_2(\lambda)$ and $\Delta n_3(\lambda)$ are known at λ=400 nm, λ=500 nm and λ=660 nm, the values for $d_1$, $d_2$ and $d_3$ can be precisely calculated so that the expression (20) is verified at these wavelengths.

$$2\pi(\Delta n_1(\lambda)d_1+\Delta n_2(\lambda)d_2+\Delta n_3(\lambda)d_3)/\lambda=2\pi \quad (20)$$

$\Delta n_1(\lambda)$, $\Delta n_2(\lambda)$ and $\Delta n_3(\lambda)$ in the expression above are rewritten as;

$$\Delta n_1(\lambda)=n_{1e}(\lambda)-n_{1o}(\lambda) \text{ or } n_{1o}(\lambda)-n_{1e}(\lambda)$$

$$\Delta n_2(\lambda)=n_{2e}(\lambda)-n_{2o}(\lambda) \text{ or } n_{2o}(\lambda)-n_{2e}(\lambda)$$

$$\Delta n_3(\lambda)=n_{3e}(\lambda)-n_{3o}(\lambda) \text{ or } n_{3o}(\lambda)-n_{3e}(\lambda)$$

$n_{1e}(\lambda)-n_{1o}(\lambda)$, $n_{2e}(\lambda)-n_{2o}(\lambda)$ and $n_{3e}(\lambda)-n_{3o}(\lambda)$ all take positive values, whereas $n_{1o}(\lambda)-n_{1e}(\lambda)$, $n_{2o}(\lambda)-n_{2e}(\lambda)$ and $n_{3o}(\lambda)-n_{3e}(\lambda)$ all take negative values.

Values of $d_1$, $d_2$ and $d_3$ respectively represent the total thicknesses of the liquid crystal material layers of the liquid crystal elements each constituting the first, second and third liquid crystal element groups. Namely, value of $d_1/2$ represents the thickness of the liquid crystal layer of each of the liquid crystal elements constituting the first liquid crystal element group, value of $d_2/2$ represents the thickness of the liquid crystal layer of each of the liquid crystal elements constituting the second liquid crystal element group and $d_3/2$ represents the thickness of the liquid crystal layer of each of the liquid crystal elements constituting the second liquid crystal element group.

If $\Delta n_1(\lambda)$, $\Delta n_2(\lambda)$ and $\Delta n_3(\lambda)$ all take positive values or negative values in expression (20), the extent of phase modulation decreases as λ becomes greater and under such circumstances, the relationship expressed in (20) cannot be achieved. If one or two among $\Delta n_1(\lambda)$, $\Delta n_2(\lambda)$ and $\Delta n_3(\lambda)$ takes a positive value and the remaining two or one takes a negative value, conditions that allow the relationship expressed in (20) to be true exist, as a concept similar to that described with regard to two different liquid crystal materials in reference to FIGS. 4(a) and 4(b) is applicable.

In order to determine the values for dr, $d_2$ and $d_3$, the following three expressions are obtained with respect to $d_1$, $d_2$ and $d_3$ by using three wavelengths 400 nm, 500 nm and 660 nm substituting for the wavelength and substituting the values corresponding to these wavelengths for $\Delta n_1(\lambda)$, $\Delta n_2(\lambda)$ and $\Delta n_3(\lambda)$ in expression (20).

$$\Delta n_1(400)d_1+\Delta n_2(400)d_2+\Delta n_3(400)d_3=400 \text{ (nm)} \quad (21)$$

$$\Delta n_1(500)d_1+\Delta n_2(500)d_2+\Delta n_3(500)d_3=500 \text{ (nm)} \quad (22)$$

$$\Delta n_1(660)d_1+\Delta n_2(660)d_2+\Delta n_3(660)d_3=660 \text{ (nm)} \quad (23)$$

Since the values for $\Delta n_1(400)$, $\Delta n_2(400)$, $\Delta n_3(400)$, $\Delta n_1(500)$, $\Delta n_2(500)$, $\Delta n_3(500)$, $\Delta n(660)$, $\Delta n_2(660)$ and $\Delta n_3(660)$ have already been determined through the calculation executed as expressed in Cauchy's dispersion formula, as has been explained earlier, the values for $d_1$, $d_2$ and $d_3$ can be calculated by using expressions (21) through (23). Through this process, the thicknesses of the individual liquid crystal material layers can be calculated in correspondence to any combination of three different liquid crystal materials.

Then, each combination of three different liquid crystal materials and the corresponding liquid crystal material layer thicknesses, which satisfy the following conditions, are selected by scrutinizing the plurality of combinations.

(i) The phase modulation error does not exceed 7% of 2πrad.
(ii) The thickness of any liquid crystal material layer does not exceed 30 μm.

Among the combinations fulfilling the conditions defined above, the combination of three liquid crystal materials, MDA-02-2359 (manufactured by Merck) for the pair of liquid crystal elements constituting the first liquid crystal element group, MLC-6608 (manufactured by Merck) for the pair of liquid crystal elements constituting the second liquid crystal element group and ZLI-4788 (manufactured by Merck) for the pair of liquid crystal elements constituting the third liquid crystal element group, are selected for the phase modulator. The refractive index wavelength dependence characteristics of these liquid crystal materials are shown in FIG. 8. These liquid crystal materials all constitute negative dielectric anisotropy (N-type) liquid crystal elements. The thicknesses $d_1$, $d_2$ and $d_3$ of the three liquid crystal material layers in this combination are calculated to be respectively 23.78 μm for the MDA-02-2359, 14.31 μm for the MLC-6608 and 18.71 μm for the ZLI-4788. Namely, the thicknesses of the liquid crystal layers of each pair of liquid crystal elements constituting the first liquid crystal element group are both 11.89 μm, the thicknesses of the liquid crystal layers of each pair of liquid crystal elements constituting the second liquid crystal element group are both 7.155 μm and the thicknesses of the liquid crystal layers of each pair of liquid crystal elements constituting the third liquid crystal element group are both 9.355 μm.

In a case phase modulation is achieved via these liquid crystal element groups, the directions of effective refractive index changes in the liquid crystal elements both in the first and second liquid crystal element groups are opposite to the direction of effective refractive index change in the liquid crystal elements in the third liquid crystal element group. Namely, in a case the effective refractive indices in both in the first and second liquid crystal element groups are increased, the effective refractive index in the third liquid crystal element group is decreased, or in a case the effective refractive indices in both in the first and second liquid crystal element groups are decreased, the effective refractive index in the third liquid crystal element group is increased.

In more specific terms, the effective refractive index differences, for each of the liquid crystal elements constituting the first liquid crystal element group (MDA-02-2359) in which the alignment direction changes from the first alignment direction to the second alignment direction or from the first alignment direction to the third alignment direction is $$\Delta n_1(\lambda) = n_{1e}(\lambda) - n_{1o}(\lambda) > 0.$$

The effective refractive index differences, for each of the liquid crystal elements constituting the second liquid crystal element group (MLC-6608) in which the alignment direction changes from the first alignment direction to the second alignment direction or from the first alignment direction to the third alignment direction is $$\Delta n_2(\lambda) = n_{2e}(\lambda) - n_{2o}(\lambda) > 0.$$

The effective refractive index differences, for each of the liquid crystal elements constituting the third liquid crystal element group (ZLI-4788) in which the alignment direction changes from the second alignment direction to the first alignment direction or from the third alignment direction to the first alignment direction is $$\Delta n_3(\lambda) = n_{3o}(\lambda) - n_{3e}(\lambda) < 0.$$

As for the first modulation condition, all of the alignment directions of the liquid crystal molecules in the liquid crystal elements in both of the first and the second liquid crystal element groups are in the first alignment direction, and in the third liquid crystal element group, the alignment directions of one of the pair of the liquid crystal elements is in the second alignment direction and the alignment direction of the other of the liquid crystal elements is in the third alignment direction.

[Simulation]

Figure 11:
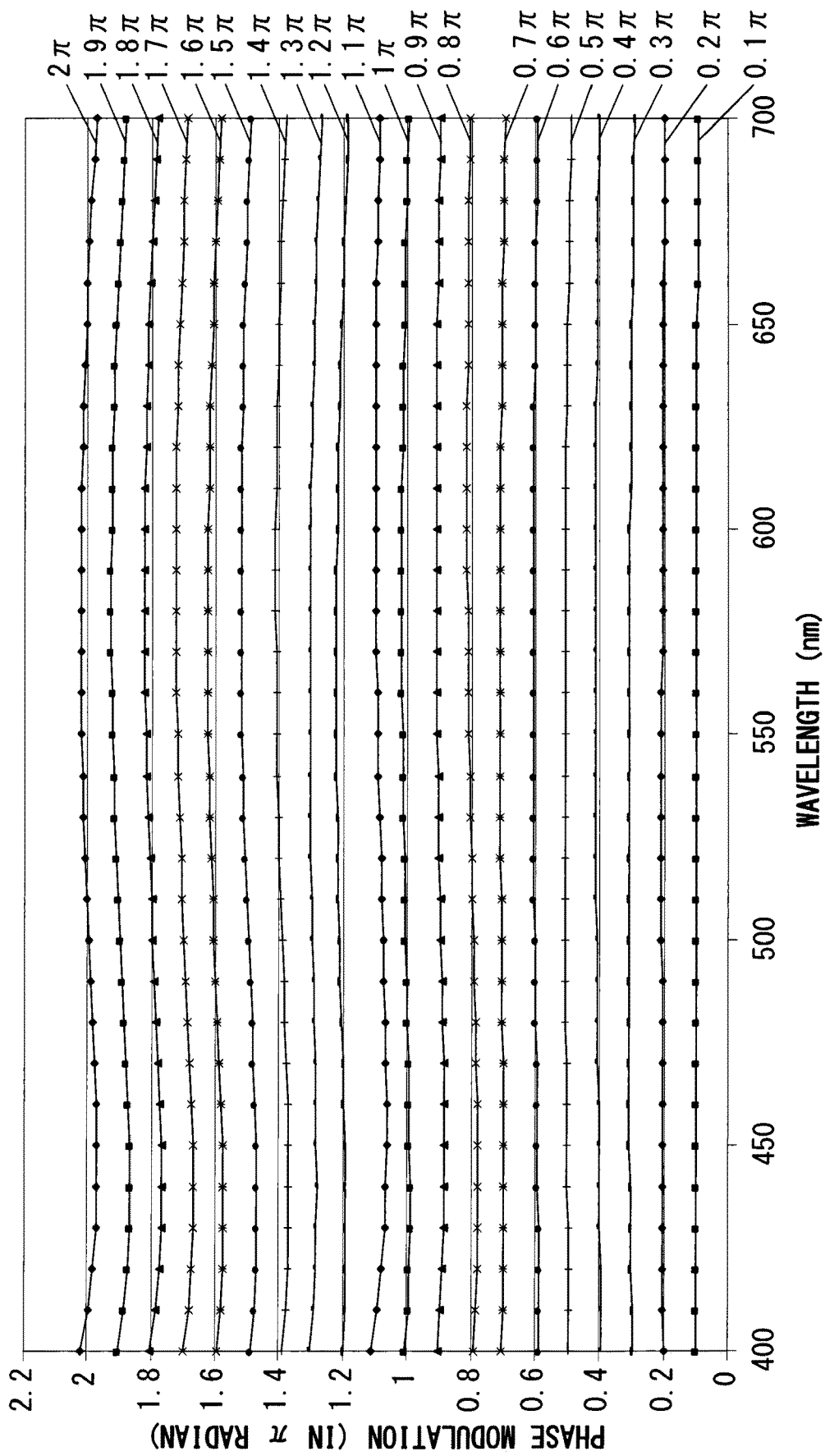
FIG. 11 presents calculation results pertaining to the phase modulation achieved by three sets of liquid crystal element groups.
Figure 12:
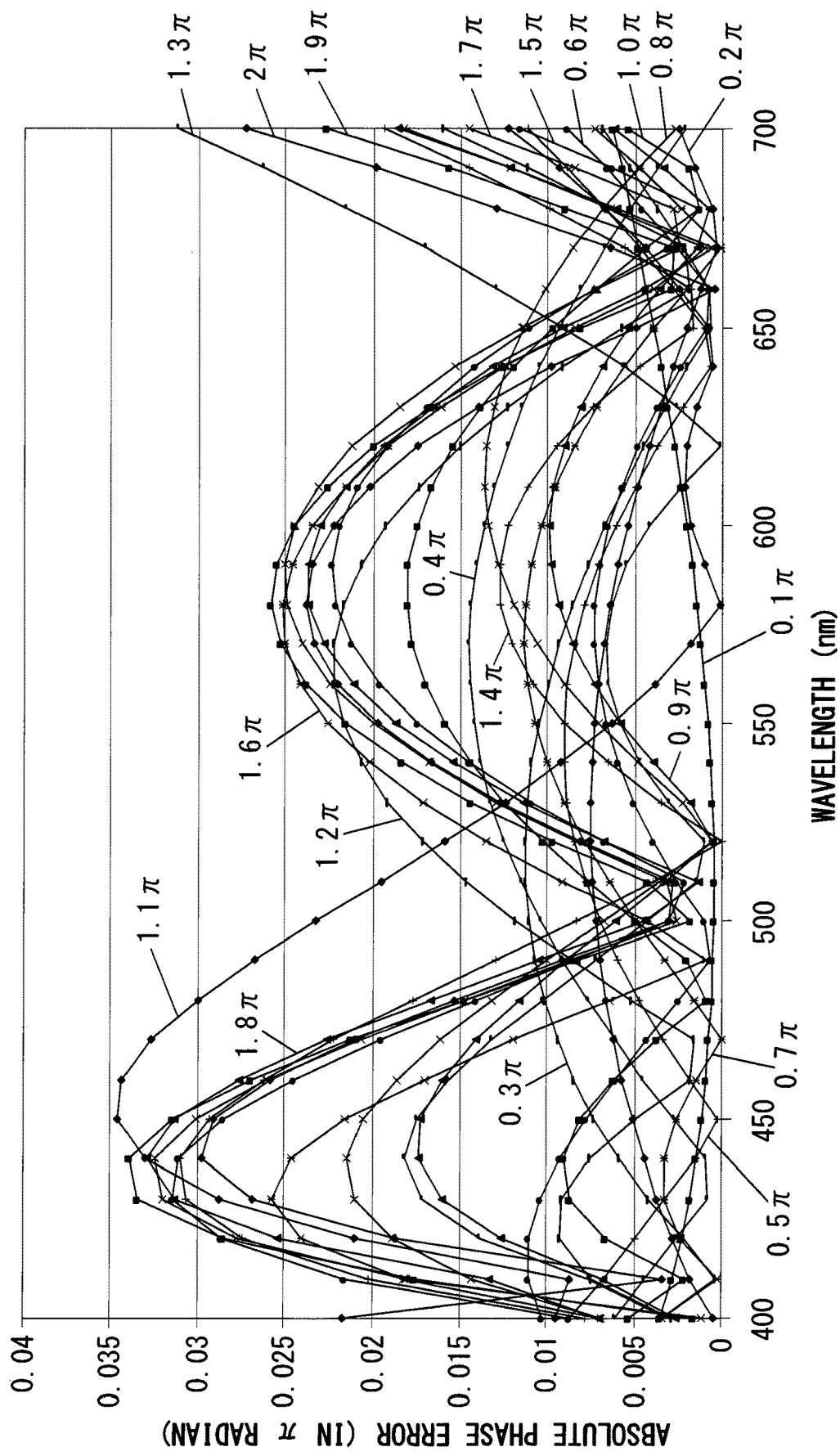
FIG. 12 presents calculation results pertaining to the error in the phase modulation achieved via three sets of liquid crystal element groups.

For a combination calculated as described above, simulations for phase modulation at various wavelengths of light in a range of 400 nm through 700 nm are conducted. To calculate maximum phase modulation of $2\pi$ rad, both the ordinary refractive indices of $n_o(\lambda)$ and the extraordinary refractive index $n_e(\lambda)$, already obtained by Cauchy's dispersion formula, are used. To determine any phase modulation other than the maximum phase modulation of $2\pi$ rad, repeated alternations of the effective refractive index are calculated to minimize phase modulation error. The result of simulation in this manner for phase modulation of $0\pi$ rad through $2\pi$ with $0.2\pi$ increments over a wavelength range of 400 nm through 700 nm is shown in FIG. 11. Moreover, the calculated absolute phase errors are shown in FIG. 12. The absolute phase shift errors for the different increments of phase shift modulation do not exceed $0.035\pi$ rad over the wavelength range from 400 nm to 700 nm. In more specific terms, the phase shift modulation $\Delta\varnothing_k$, occurring as the alignment of the liquid crystal molecules, initially sustaining the first modulation condition, changes to a second modulation condition, can be expressed as in the expression (24) below.

$$2\pi(\Delta n_1(\lambda,\alpha_1)d_1 + \Delta n_2(\lambda,\alpha_1)d_2 + \Delta n_3(\lambda,\alpha_3)d_3)/\lambda = \Delta\varnothing_k \quad (24)$$

here, $$\Delta n_1(\lambda) = n_{1e\!f\!f}(\lambda,\alpha_1) - n_{1o}(\lambda) > 0$$

$$\Delta n_2(\lambda) = n_{2e\!f\!f}(\lambda,\alpha_2) - n_{2o}(\lambda) > 0$$

$$\Delta n_3(\lambda) = n_{3e\!f\!f}(\lambda,\alpha_3) - n_{3e}(\lambda) < 0$$

Here, $\alpha_1$, $\alpha_2$ and $\alpha_3$ are respectively tilt angles of the liquid crystal molecules in the liquid crystal elements constituting the first, second and third liquid crystal element groups to the light advancing direction at the second modulation condition. The effective refractive index $n_{e\!f\!f}(\lambda, \alpha)$ is described by the expression (5). In practice, repeated calculations are executed to minimize the phase shift modulation error at the designed wavelengths of 400 nm, 500 nm and 660 nm. The optimization of the effective refractive indices of liquid crystal elements respectively constituting the first, second and third liquid crystal element groups is realized through the change of the direction of alignment of liquid crystal molecules $\alpha_1$, $\alpha_2$ and $\alpha_3$.

[Example of Method for Manufacturing a Liquid Crystal Element]

Following description is one example for method of manufacturing a liquid crystal element. An ITO (indium tin oxide) coating and polyimide coating are applied to a surface of each glass substrate making up a set of glass substrates, so as to form an electrode layer and an alignment layer respectively. Depending on the polyimide used, homogeneous or homeotropic alignment can be achieved: in the case of homogeneous alignment, the alignment layer can be rubbed along one direction to align the liquid crystal molecules at its vicinity parallel to the glass substrate and following the rubbing direction with a small pre-tilt angle of typically of few degrees. In the case of homeotropic alignment, the alignment layer can be gently rubbed along one direction to align the liquid crystal molecules at its vicinity almost perpendicular to the glass substrate and following a rubbing pre-tilt angle between 85 to 89 degrees.

The glass substrates are then disposed at fixed positions set apart from each other so as to allow the alignment layers formed thereat to face opposite to each other. If the alignment layers are with homogeneous alignment and have anti-parallel rubbing directions, a liquid crystal material with a positive dielectric anisotropy is injected into the space between the glass substrates to form an anti-parallel aligned electrically controlled birefringence (ECB) liquid crystal cell. If the alignment layers are with homeotropic alignment and have anti-parallel rubbing directions, a liquid crystal material with a negative dielectric anisotropy is injected into the space between the glass substrates to form an vertically aligned (VA) electrically controlled birefringence (ECB) liquid crystal cell. The gap between the glass substrates is set so that the liquid crystal material layer in the finished liquid crystal element achieves a predetermined thickness. The liquid crystal element is manufactured by fixing lead wires to the electrode layers after sealing in the liquid crystal material.

[Example of Method for Setting Voltages to be Applied]

Figure 13:
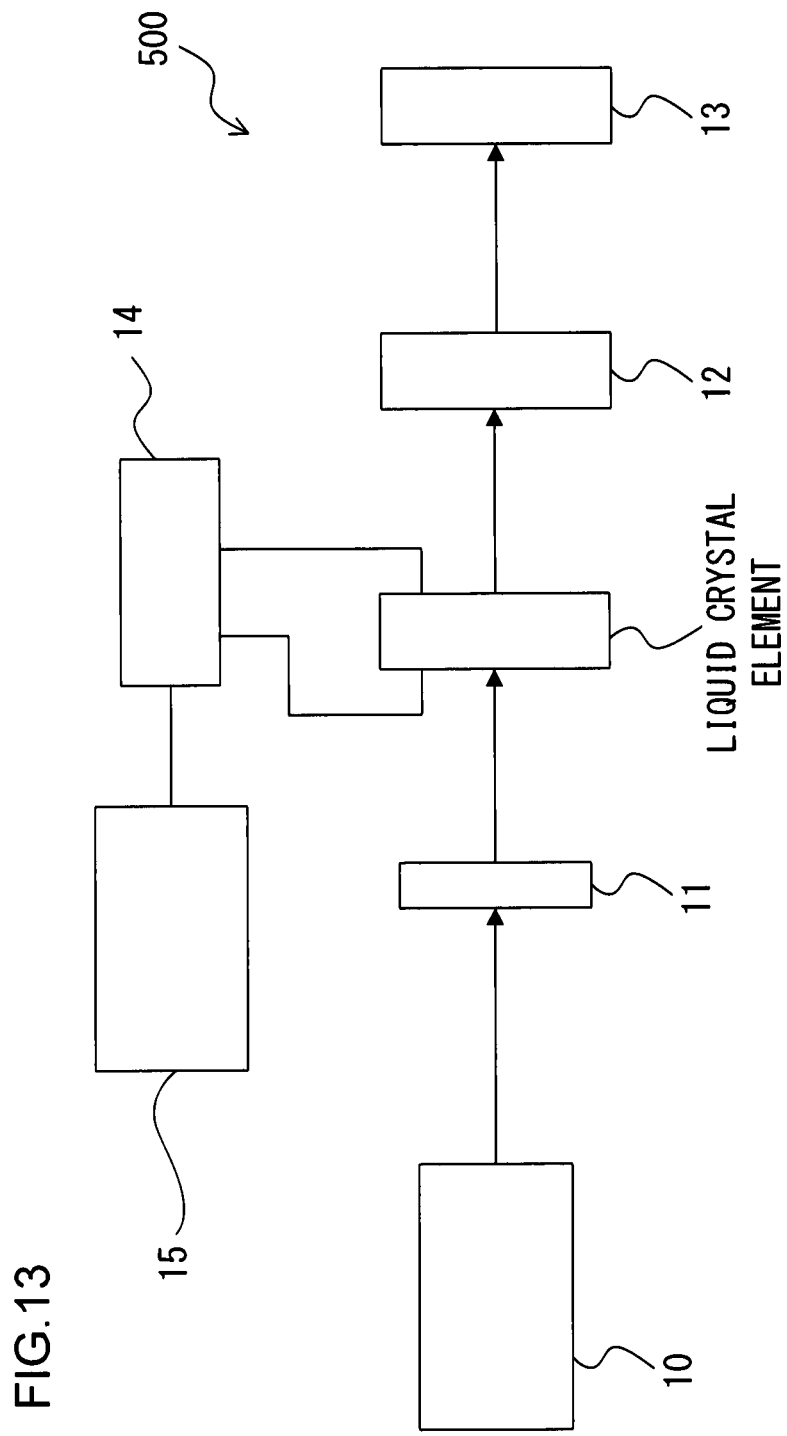
FIG. 13 is a schematic diagram showing the structure of a phase measurement device used to set a drive electric signal to be applied to a liquid crystal element.

One example of method that may be adopted when determining the values for the voltages to be applied to the individual liquid crystal elements in order to achieve the refractive index changes at the liquid crystal elements will be described next. A phase measuring setup 500 shown in FIG. 13 is used to measure the phase modulation achieved via a liquid crystal element. The phase measuring setup 500 shown in FIG. 9 comprises a laser light source 10 that emits light having a wavelength of 632.8 nm, a first polarizing plate 11 and a second polarizing plate 12 disposed so that the transmission axes thereof extend perpendicular to each other, and a light intensity detector 13. The first polarizing plate 11, the second polarizing plate 12 and the light intensity detector 13 are all disposed on the light path of the light emitted from the laser light source 10. The liquid crystal element to undergo the phase measurement is positioned between the first polarizing plate 11 and the second polarizing plate 12. A power source 14 is connected to the liquid crystal element so as to apply a voltage from the power source 14 to the liquid crystal element, and the voltage applied to the liquid crystal element from the power source 14 is controlled by a control device 15. The liquid crystal element is positioned so that when the liquid crystal molecules therein enter the second alignment direction, the direction along which the liquid crystal molecules are aligned forms a 45° angle with the transmission axis of each of the two polarizing plates.

The light emitted from the laser light source becomes linearly polarized as it is transmitted through the first polarizing plate 11 and the linearly polarized light then enters the liquid crystal elements. While the alignment direction of the liquid crystal molecules in the liquid crystal element sustains the first alignment direction, no birefringence attributable to the liquid crystal material occurs and thus, the polarization direction of the linearly polarized light remains unchanged. This means that the linearly polarized light having been transmitted through the liquid crystal element is not transmitted through the second polarizing plate 12, and for this reason, the intensity of the light detected at the light intensity detector 13 is close to zero. However, under the circumstances that the alignment direction of the liquid crystal molecules in the liquid crystal element is in the second alignment direction, the direction along which the liquid crystal molecules are aligned forms a 45° angle relative to the transmission axis of the first polarizing plate 11 and, as a result, birefringence occurs at the liquid crystal material. This, in turn, alters the linearly polarized light to elliptically polarized light (or circularly polarized light), and part of this elliptically polarized light is transmitted through the second polarizing plate 12 and reaches the light intensity detector 13. Consequently, the light intensity detector 13 is able to detect a certain level of light intensity.

Accordingly, a specific relationship between the voltage V applied to the liquid crystal element and the light intensity I' can be ascertained by measuring the detection target light intensity via the light intensity detector while the control device 15 controls the voltage applied from the power source 14 to the liquid crystal element so as to alter the alignment direction of the liquid crystal molecules from the first alignment direction to the second alignment direction. Namely, the relationship expressed as;

$$I'=f(V) \quad (25)$$

is defined. The relationship expressed as in (18) below exists between the phase retardation achieved via the liquid crystal element and the light intensity.

$$I'(\Delta\emptyset)=(\tfrac{1}{2})\sin^2(\Delta\emptyset/2) \quad (26)$$

Thus, the relationship between the voltage applied to the liquid crystal element and the phase retardation can be determined. In addition, when the voltage application is controlled so as to alter the alignment direction of the liquid crystal molecules in the liquid crystal element currently in the first alignment direction to a given alignment direction between the first alignment direction and the second alignment direction, the relationship expressed as in (21) below exists between the effective refractive index change and the phase modulation.

$$\Delta\emptyset=2\pi d(n_{eff}(\lambda)-n_o(\lambda))/\lambda \quad (27)$$

In the expression (27), $n_{eff}(\lambda)$ represents the effective refractive index for light having a wavelength $\lambda$ in the given alignment direction of the liquid crystal molecules between the light advancing direction and the direction parallel to the substrate of the liquid crystal element. Accordingly, the relationship between the intermediate refractive index $n_{eff}(\lambda)$ at the liquid crystal element and the voltage V applied to the liquid crystal element can be determined by using expressions (25) through (27). The relationship between the intermediate refractive index $n_{eff}(\lambda)$ and the applied voltage V is determined through the procedure described above for each of the liquid crystal elements selected to configure a phase modulator. As each of the pair of liquid crystal elements constituting one liquid crystal element group have the same structures with each other, phase modulation quantity via one liquid crystal element group is double of that via one of the pair of the liquid crystal elements in the liquid crystal element group. It is to be noted that applying voltages to the pair of the liquid crystal elements in one liquid crystal element group are substantially the same with each other.

Through the processes described above, the values representing the voltage to be applied to each liquid crystal element comprising the phase modulator are determined each in correspondence to a specific extent of phase modulation among varying extents of phase modulation within the range of 0 through $2\pi$rad. These voltage values are stored, each in correspondence to a value representing a specific extent of phase modulation, in the form of a voltage application data table into a storage unit (not shown) of the control device.

[Examples of Achromatic Phase Modulators]

As explained above, FIG. 5 schematically illustrates the achromatic phase modulator 100 as the example of the achromatic phase modulator configured by disposing two sets of liquid crystal element groups. Each of the liquid crystal elements constituting the first and second liquid crystal element groups are connected with power sources 14 that provide voltages to be applied to the respective liquid crystal elements. A control device 15 controls the voltages to be applied from the power sources 14 to the respective liquid crystal elements. It is to be noted that there are no restrictions whatsoever with respect to the order in which each of the liquid crystal elements are disposed. As incident light sequentially passes through the liquid crystal elements, the phase of the incident light undergoes achromatic phase modulation.

In addition, FIG. 7 schematically illustrates an achromatic phase modulator 200 as the example of the achromatic phase modulator configured by disposing three sets of liquid crystal element groups. Each of the liquid crystal elements constituting the first, second and third liquid crystal element groups are connected with power sources 214 that provide voltages to be applied to the respective liquid crystal elements. A control device 215 controls the voltages to be applied from the power sources 214 to the respective liquid crystal elements. It is to be noted that there are no restrictions whatsoever with respect to the order in which each of the liquid crystal elements are disposed. As incident light sequentially passes through the three liquid crystal elements, the phase of the incident light undergoes achromatic phase modulation.

[Example of Method for Measuring Phase Modulation Error]

Figure 14:
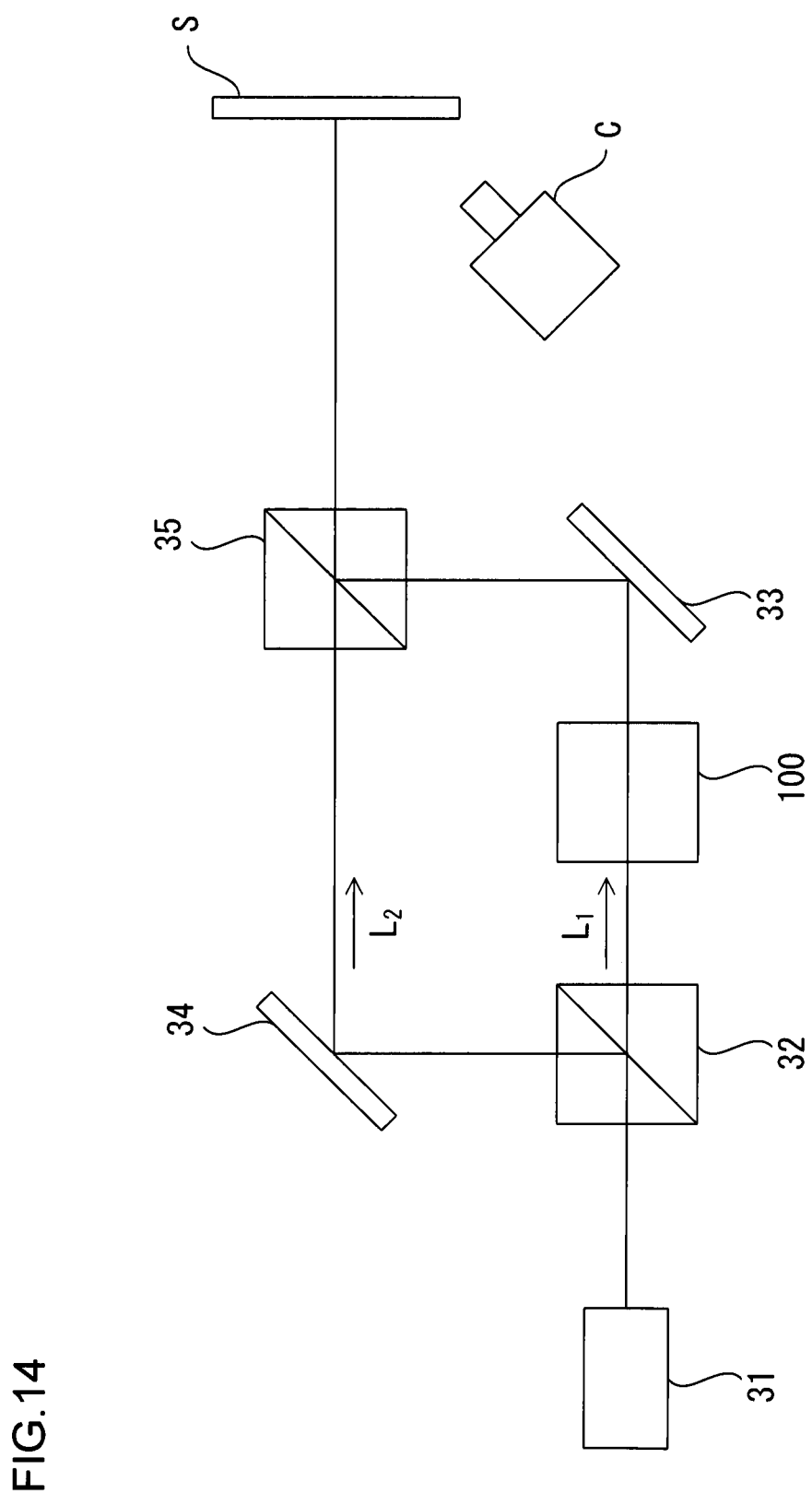
FIG. 14 is a schematic diagram showing the structure of a Mach-Zehnder type interference measurement device engaged in measurement of the phase modulation achieved by a phase modulator.

One example of method for measuring phase modulation error will be described below. The phase modulator 100 or 200 is set at a Mach-Zehnder interferometer 600, as shown in FIG. 14, in order to measure the phase modulation achieved by the phase modulator. FIG. 14 shows the phase modulator 100 is set at the Mach-Zehnder interferometer. Light emitted from a laser light source 31 enters a beam splitter 32. The light exiting the beam splitter 32 travels on two separate light paths $L_1$ and $L_2$. The phase modulator 100 is disposed in the light path $L_1$. The phase of the light transmitted through the phase modulator 100 is modulated in correspondence to the voltages applied to each of the liquid elements therein, the light having undergone the phase modulation is then reflected at a reflecting mirror 33 to enter a beam splitter 35. The light advancing through the light path $L_2$ is reflected at a reflecting mirror 34 and enters the beam splitter 35. Light having traveled through the light path $L_1$ and light having traveled through the light path $L_2$ become superimposed upon each other at the beam splitter 35. The superimposed light is expanded as necessary via a lens and the light is then projected onto a screen S. The light exiting the beam splitter 35, which is made up with the light having undergone the phase modulation as it traveled through the light path $L_1$ and the light having traveled through the light path $L_2$ without undergoing phase modulation, superimposed upon each other, manifests interference and, as a result, interference fringes appear on the screen S.

It is to be noted that, when the phase modulator 200 is set at the Mach-Zehnder interferometer, the phase modulator 200 is disposed in the light path $L_1$ instead of the phase modulator 100, and the phase of the light transmitted through the phase modulator 200 is modulated in correspondence to the voltages applied to each of the liquid elements therein.

A He—Ne laser that outputs light having a wavelength of 632.8 nm, for example, is used as the laser light source 31. The power sources 14 or 214 (shown in FIG. 5 or FIG. 7) are controlled so as to apply voltages to the individual liquid crystal elements as indicated in the voltage application data table stored in the storage unit of the control device 15 (shown in FIG. 5 or FIG. 7. Via the control device 15 or 215, the voltages applied to the individual liquid crystal elements are controlled in correspondence to various target extents of phase modulation, for example, 0 (0π rad), 0.5π rad, 1π rad, 1.5π rad and 2π rad or the like. The move of the interference fringes projected onto the screen S in correspondence to each target phase modulation extent are captured with a CMOS image sensor in a camera C. Then, based upon the shift in the interference fringes having been recorded, the phase modulation that has actually occurred is determined through calculation.

Next, the voltages applied to the individual liquid crystal elements are controlled in correspondence to the various target extents of phase modulation, for example, 0π rad, 0.5π rad, 1π rad, 1.5π rad and 2π rad or the like, by using another laser light source 31 that is a He—Ne laser capable of outputting light having a wavelength of 543.5 nm, for example, through a procedure similar to that described above. The interference fringes projected onto the screen S in correspondence to each target phase modulation extent are captured with a CMOS image sensor in the camera C and shift occurring in the interference fringes are recorded. Then, based upon the shift in the interference fringes having been recorded, the phase modulation that has actually occurred is determined through calculation. Moreover, by measuring in a similar manner by changing the light source to ones having various wavelengths other than above described two wavelengths, it may be possible to measure phase modulation error for more wavelengths of light.

The following advantages are achieved through the embodiments described above.

(1) The phase modulator according to the embodiments of the present invention is configured by disposing a plurality of liquid crystal elements in series. These liquid crystal elements respectively constitute at least two sets of liquid crystal element groups. Refractive index wavelength dependence characteristics of liquid crystal materials in different liquid crystal element groups are different from each other. The changes in the effective refractive indices occur along opposite directions at the pair of liquid crystal elements constituting the first liquid crystal element group and the pair of liquid crystal elements constituting the second liquid crystal element group. Specific drive electric signals are applied to individual liquid crystal elements. Such a phase modulator is capable of achieving achromatic phase modulation independent from polarization, thus it is capable of achieving achromatic phase modulation for light including non-polarized light over a wide wavelength range.

(2) The liquid crystal elements in the phase modulator according to the embodiments of the present invention are nematic liquid crystal elements in which liquid crystal molecules are allowed to be aligned along the predetermined direction. The use of such nematic liquid crystal elements makes it possible to provide an achromatic phase modulator with a simple structure.

(3) In the phase modulator according to the embodiments of the present invention, in each of the liquid crystal elements, it is capable to set various combination of first and second alignment condition in correspondence to the applying drive electric signals to each of the liquid crystal elements. Such a phase modulator makes it possible to provide an achromatic phase modulator with a simple structure.

The embodiments described above allow for the following variations.

(Variation 1)

The embodiments have been described by assuming that the liquid crystal elements are disposed at positions set apart from one another. However, the present invention is not limited to this example and the liquid crystal elements may be disposed in contact with one another in each of the liquid crystal element groups. Moreover, two liquid crystal elements they are constituting different liquid crystal element groups from each other may be disposed in contact with one another. Such an achromatic phase modulator is shown in FIG. 15. In FIG. 15, X axis is to be set in a direction perpendicular to the drawing sheet, Y axis is to be set in a direction parallel to the drawing sheet, and Z axis is to be set in a direction along the incident light advancing.

(Variation 2)

Two liquid crystal elements may be disposed in contact with one another without air layer. Furthermore, contacted two liquid crystal elements may have one substrate between them in common.

(Variation 3)

The pair of liquid crystal elements constituting each of the liquid crystal element groups may be built as one integrated liquid crystal element having a pair of substrates and a separating layer, centrally located between the pair of substrates, separates thereby to each of the pair liquid crystal elements. The separating layer is constructed as a double layers each having anisotropy perpendicular to each other.

By employing such structure, liquid crystal molecules in both sides of the polymer layer can be easily aligned along a directions perpendicular to each other. The structured achromatic phase modulator is showed in FIG. 16. In FIG. 16, X axis is to be set in a direction perpendicular to the drawing sheet, Y axis is to be set in a direction parallel to the drawing sheet, and Z axis is to be set in a direction along the incident light advancing.

(Variation 4)

In the embodiments described above, the thickness of the liquid crystal material layer in each liquid crystal element is determined based upon the maximum extent of change in the refractive index, i.e., the difference between the ordinary refractive index $n_o(\lambda)$ in the first alignment direction in which the liquid crystal molecules are aligned along the direction perpendicular to the substrate surfaces and the extraordinary refractive index $n_e(\lambda)$ in the second alignment direction in which the liquid crystal molecules are aligned along the direction parallel to the liquid crystal substrate surfaces. However, the present invention is not limited to this example and the thickness of the liquid crystal material layer may instead be determined based upon the difference between the effective refractive indices in any two alignment directions of the liquid crystal molecules between the direction corresponding to the ordinary refractive index $n_o(\lambda)$ and the direction corresponding to the extraordinary refractive index $n_e(\lambda)$.

(Variation 5)

Figure 17:
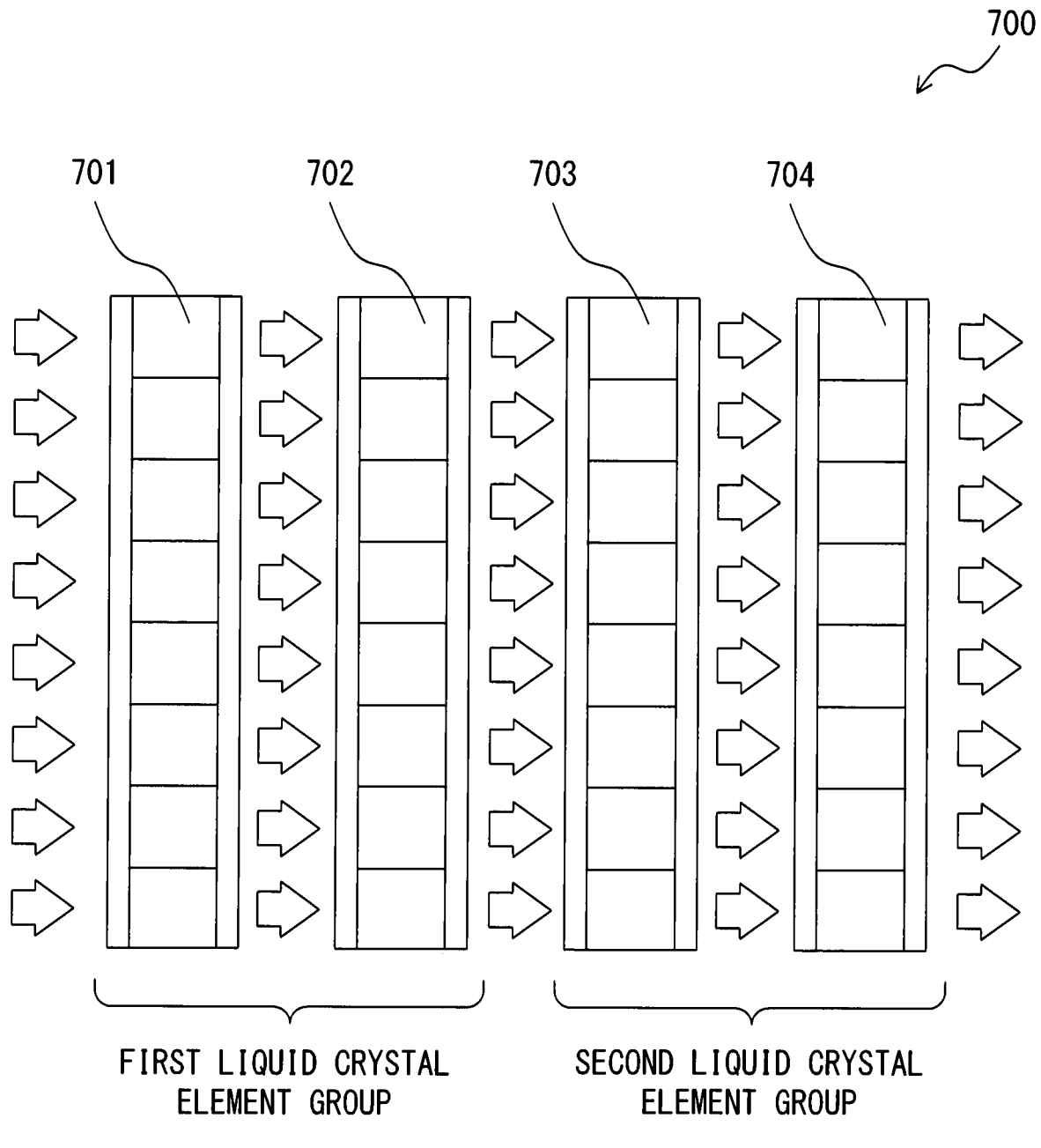
FIG. 17 is a schematic diagram showing the structure of an achromatic phase modulator according to the one embodiment of the present invention, configured by using liquid crystal elements each having divisional liquid crystal areas.

The embodiments have been described by assuming that each liquid crystal element is engaged in operation as a whole. However, the present invention is not limited to this example and it may be adopted in conjunction with liquid crystal elements each having a plurality of separate divisional liquid crystal areas arranged in a two-dimensional array. A phase modulator adopting such a configuration should be structured by ensuring that the voltages applied to these separate divisional liquid crystal areas can be individually controlled and that the divisional liquid crystal areas in one liquid crystal substrate are set in correspondence to the divisional liquid crystal areas in another liquid crystal substrate. FIG. 17 shows an achromatic phase modulator 700 adopting this configuration. In FIG. 17, X axis is to be set in a direction perpendicular to the drawing sheet, Y axis is to be set in a direction parallel to the drawing sheet, and Z axis is to be set in a direction along the incident light advancing. In the achromatic phase modulator 700 in FIG. 17, divisional liquid crystal areas formed at one liquid crystal element. One of a divisional liquid crystal area 701 formed one of the liquid crystal elements corresponds to divisional liquid crystal areas 702, 703 and 704 formed at other liquid crystal elements so that light propagates between each divisional liquid crystal areas set in correspondence to each other but light does not propagate from one divisional liquid crystal area to other divisional liquid crystal areas they are not in correspondence to each other. It is to be noted that FIG. 17 does not include illustration of the light sources or the control device.

(Variation 6)

The embodiments have been described by assuming that the achromatic phase modulators are configured with two or three sets of liquid crystal element groups. However, the present invention may be configured with more than three sets of liquid crystal element groups.

It is to be noted that the embodiments and variations described above simply represent examples and the present invention is in no way limited to these examples as long as the features characterizing the present invention remain intact. Any other mode conceivable within the technical range of the present invention should, therefore, be considered to be within the scope of the present invention.

EXPLANATION OF REFERENCE NUMERALS 1 substrate
2 liquid crystal material
10, 31 laser light source
11, 12 polarizing plate
13 light intensity detector
14, 214, 314, 414 power source
15, 215, 315, 415 control device
33, 35 beam splitter
34, 34 reflecting mirror
100, 200, 300, 400, 700 phase modulator
701, 702, 703, 704 divisional liquid crystal area
500 phase measuring device
600 Mach-Zehnder interferometer

The invention claimed is:

1. An achromatic phase modulator that modulates phase of an incident light and outputs the light having undergone phase modulation, comprising:
  a plurality of liquid crystal elements disposed in series on a light path of the incident light, which are composed of liquid crystal materials; and
  a control unit for applying drive electric signals to the liquid crystal elements so as to achieve achromatic phase modulation for the incident light, wherein:
  the plurality of liquid crystal element comprises at least a first liquid crystal element group composed of a pair of liquid crystal elements both of which liquid crystal materials have a first refractive index wavelength dependence characteristics and a second liquid crystal element group composed of a pair of liquid crystal elements both of which liquid crystal materials have a second refractive index wavelength dependence characteristics;
  thicknesses of both of liquid crystal material layers of the liquid crystal elements constituting the first liquid crystal element group are substantially the same as each other, and thicknesses of both of liquid crystal material layers of the liquid crystal elements constituting the second liquid crystal element group are substantially the same as each other;
  in the pair of liquid crystal elements constituting the first liquid crystal element group:
    an alignment direction of liquid crystal molecules of one of the liquid crystal elements can be altered in a plane including a first alignment direction substantially parallel to a direction in which the incident light advances, and a second alignment direction perpendicular to the first alignment direction, and
    an alignment direction of liquid crystal molecules of another of the liquid crystal elements can be altered in a plane including the first alignment direction and a third alignment direction perpendicular to both of the first alignment direction and the second alignment direction;
  in the pair of liquid crystal elements constituting the second liquid crystal element group:
    an alignment direction of liquid crystal molecules of one of the liquid crystal element can be altered in a plane including the first alignment direction and a fourth alignment direction perpendicular to the first alignment direction, and an alignment direction of liquid crystal molecules of another of the liquid crystal elements can be altered in a plane including the first alignment direction and a fifth alignment direction perpendicular to both of the first alignment direction and the fourth alignment direction;

in each of the plurality of the liquid crystal elements, the alignment directions of the liquid crystal molecules can be set individually to a first modulation condition under which a first modulation quantity is achieved and to a second modulation condition under which a second modulation quantity different from the first modulation quantity is achieved, in correspondence to the applying drive electric signals to each of the liquid crystal elements; and for light having a given wavelength, in one of the first and second liquid crystal element groups, an average of refractive indices of the pair of liquid crystal elements in the first alignment condition is greater than an average of refractive indices of the pair of liquid crystal elements in the second alignment condition, and in the other of the first and second liquid crystal element groups, an average of refractive indices of the pair of liquid crystal elements in the first alignment condition is smaller than an average of refractive indices of the pair of liquid crystal elements in the second alignment condition.

2. The achromatic phase modulator according to claim 1, wherein:
while the drive electric signal is not being applied to each of the liquid crystal elements,
both of the alignment directions of the pair of liquid crystal molecules constituting the first liquid crystal element group are in the first alignment direction, whereas
one of the alignment directions of the pair of liquid crystal molecules constituting the second liquid crystal element group is in the fourth alignment direction and the other of the alignment directions of the pair of liquid crystal molecules constituting the second liquid crystal element group is in the fifth alignment direction.

3. The achromatic phase modulator according to claim 1, wherein:
the second alignment direction is identical to the fourth alignment direction and the third alignment direction is identical to the fifth alignment direction.

4. The achromatic phase modulator according to claim 1, further comprising:
a third liquid crystal element group composed of a pair of liquid crystal elements, disposed in series on the light path of the incident light, both of which liquid crystal materials have a third refractive index wavelength dependence characteristics, wherein:
in the pair of liquid crystal elements constituting the third liquid crystal element group:
an alignment direction of liquid crystal molecules of one of the liquid crystal elements can be altered in a plane including the first alignment direction and a sixth alignment direction perpendicular to the first alignment direction, and
an alignment direction of liquid crystal molecules of another of the liquid crystal elements can be altered in a plane including the first alignment direction and a seventh alignment direction perpendicular to both of the first alignment direction and the sixth alignment direction; and thicknesses of both of liquid crystal material layers of the liquid crystal elements constituting the third liquid crystal element group are substantially the same as each other.

5. The achromatic phase modulator according to claim 4, wherein:
in each of the plurality of the liquid crystal elements, the alignment directions of the liquid crystal molecules can be set individually to a first alignment condition under which a first modulation quantity is achieved and to a second modulation condition under which a second modulation quantity different from the first modulation quantity is achieved, in correspondence to the applying drive electric signals to each of the liquid crystal elements; and
for light having a given wavelength:
in two of the first, second and third liquid crystal element groups, an average of refractive indices of the pair of liquid crystal elements in the first alignment condition is greater than an average of refractive indices of the pair of liquid crystal elements in the second alignment condition, and in remaining one of the first, second and third liquid crystal element groups, an average of refractive indices of the pair of liquid crystal elements in the first alignment condition is smaller than an average of refractive indices of the pair of liquid crystal elements in the second alignment condition, or
in one of the first, second and third liquid crystal element groups, an average of refractive indices of the pair of liquid crystal elements in the first alignment condition is greater than an average of refractive indices of the pair of liquid crystal elements in the second alignment condition, and in remaining two of the first, second and third liquid crystal element groups, an average of refractive indices of the pair of liquid crystal elements in the first alignment condition is smaller than an average of refractive indices of the pair of liquid crystal elements in the second alignment condition.

6. The achromatic phase modulator according to claim 4, wherein:
while the drive electric signal is not being applied to the each of the liquid crystal elements,
all of the alignment directions of the pair of liquid crystal molecules constituting the first, second and third liquid crystal element groups are in the first alignment direction.

7. The achromatic phase modulator according to claim 4, wherein:
at least two of the alignment directions among the second alignment direction, the fourth alignment direction and the sixth alignment direction are the same as each other, and at least two of the alignment directions among the third alignment direction, the fifth alignment direction and the seventh alignment direction are the same as each other.

8. The achromatic phase modulator according to claim 1, wherein:
the control unit applies substantially the same control electric signals to each of the pair of liquid crystal elements constituting in each of the liquid crystal elements.

9. The achromatic phase modulator according to claim 1, wherein:
the incident light has a wavelength within a visible range; and the liquid crystal elements are all nematic liquid crystal elements.

10. The achromatic phase modulator according to claim 1, wherein:

in at least one of the liquid crystal element groups, the pair of liquid crystal elements are positioned in series along the incident light advancing direction to each other.

11. The achromatic phase modulator according to claim 1, wherein:

in at least one of the liquid crystal element groups, the pair of liquid crystal elements are positioned in contact with each other.

12. The achromatic phase modulator according to claim 1, wherein:

in at least one of the liquid crystal element groups, the pair of liquid crystal elements build an integrated liquid crystal element having a pair of substrates and a layer, centrally located between the pair of substrates, separating the pair of liquid crystal elements.

13. The achromatic phase modulator according to claim 1, wherein:

the integrated liquid crystal element is to be applied with single system drive electric signal.

14. The achromatic phase modulator according to claim 1, wherein:

thicknesses of liquid crystal material layers at the liquid crystal elements are set so as to achieve any extent of phase modulation falling within the range between zero and the maximum phase modulation by controlling the drive electric signals to be applied to each of the liquid crystal elements.

15. The achromatic phase modulator according to claim 1, wherein:

the drive electric signal is provided as a voltage.

16. The achromatic phase modulator according to claim 1, wherein:

the thicknesses of the liquid crystal material layers at the liquid crystal elements constituting each of the liquid crystal element groups are all set equal to or less than 30 μm.

17. The achromatic phase modulator according to claim 1, wherein the liquid crystal elements are each divided into a plurality of separate divisional liquid crystal areas arranged in a two-dimensional array;

the divisional liquid crystal areas arrayed at one liquid crystal element corresponds to the divisional liquid crystal areas at another liquid crystal element; and the control means executes control so as to apply a drive electric signal individually to each of the divisional liquid crystal areas.

18. An optical device comprising the achromatic phase modulator according to claim 1.

19. The optical device according to claim 18, wherein a haze is equal to 2% or less.

* * * * *